(12) United States Patent
Slotznick

(10) Patent No.: US 11,444,990 B1
(45) Date of Patent: *Sep. 13, 2022

(54) SYSTEM AND METHOD OF ENABLING A NON-HOST, PARTICIPANT-INITIATED BREAKOUT SESSION IN A VIDEOCONFERENCING SYSTEM UTILIZING A VIRTUAL SPACE, AND SIMULTANEOUSLY DISPLAYING A SESSION VIEW OF A VIDEOCONFERENCING SESSION AND THE PARTICIPANT-INITIATED BREAKOUT SESSION

(71) Applicant: Benjamin Slotznick, Mt. Gretna, PA (US)

(72) Inventor: Benjamin Slotznick, Mt. Gretna, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,568

(22) Filed: May 20, 2022

Related U.S. Application Data

(63) Continuation of application No. 17/569,134, filed on Jan. 5, 2022, now Pat. No. 11,343,293.

(Continued)

(51) Int. Cl.
| | | |
|---|---|---|
| *H04L 65/401* | (2022.01) | |
| *H04L 65/1093* | (2022.01) | |
| *H04N 5/272* | (2006.01) | |
| *G06F 3/16* | (2006.01) | |

(52) U.S. Cl.
CPC ......... *H04L 65/4015* (2013.01); *G06F 3/165* (2013.01); *H04L 65/1093* (2013.01); *H04N 5/272* (2013.01)

(58) Field of Classification Search
CPC .... G06F 3/04842; H04N 5/278; H04N 7/155; H04N 7/141; H04N 7/14; H04N 7/15; H04N 7/157

(Continued)

(56) References Cited

U.S. PATENT DOCUMENTS

| | | | |
|---|---|---|---|
| 11,107,490 B1 | 8/2021 | Slotznick | |
| 2010/0279266 A1* | 11/2010 | Laine | ...................... G09B 5/00 434/350 |

(Continued)

OTHER PUBLICATIONS

"What is a Virtual Camera & how to use it?" finncastuserblog, downloaded from webpage: https://web.archive.org/web/20210509112248/http://videoblogtech.com/2019/09/19/using-a-virtual-camera-in-other-programs-websites/, posting date: Sep. 19, 2019,2 pages.

(Continued)

*Primary Examiner* — Maria El-Zoobi
(74) *Attorney, Agent, or Firm* — Panitch Schwarze Belisario & Nadel LLP

(57) ABSTRACT

Methods and apparatus are provided for simultaneously displaying a session view of a videoconferencing session and a participant-initiated breakout session view. The session view displays a video feed of the videoconferencing session to meeting participants of the videoconferencing session on their respective participant computers. The breakout session participants are a subset of the meeting participants. The simultaneous display may be generated by a videoconferencing system to be displayed on a single online meeting user interface, or the simultaneous display may be created from two different videoconferencing systems, one for creating the session view, and another one for creating the participant-initiated breakout session view. The session view of the videoconferencing session is a breakout session, and the non-host participant-initiated breakout session is a further breakout session created from this breakout session. The videoconferencing session that is a breakout session is formed by meeting participants of the videoconferencing session who are in proximity to each other in virtual space.

14 Claims, 12 Drawing Sheets

Related U.S. Application Data

(60) Provisional application No. 63/161,727, filed on Mar. 16, 2021, provisional application No. 63/137,429, filed on Jan. 14, 2021, provisional application No. 63/134,713, filed on Jan. 7, 2021.

(58) Field of Classification Search
USPC .............................................. 348/14.01–14.9
See application file for complete search history.

(56) References Cited

U.S. PATENT DOCUMENTS

| | | | |
|---|---|---|---|
| 2011/0196928 A1* | 8/2011 | Pryhuber | H04N 7/15 709/204 |
| 2012/0144320 A1 | 6/2012 | Mishra et al. | |
| 2018/0063480 A1 | 3/2018 | Luks et al. | |
| 2019/0088153 A1* | 3/2019 | Bader-Natal | H04N 7/155 |
| 2021/0352244 A1 | 11/2021 | Benedetto et al. | |

OTHER PUBLICATIONS

Jitsi User FAQ, downloaded from: <https://jitsi.org/user-faq/>, download date: Jan. 4, 2022, original posting date: unknown, 3 pages.

Jonathan Hu, "How to Use OBS's Virtual Camera." Open Broadcaster Software (OBS), downloaded from webpage: <https://www.nextofwindows.com/how-to-use-obss-virtual-camera>, Oct. 29, 2020, 6 pages.

Rebekah Carter, "Zoom Immersive Scenes vs Microsoft Teams Together Mode—Which vendor offers the best video experiences?" UC Today, downloaded from webpage: <https://www.uctoday.com/collaboration/team-collaboration/zoom-immersive-scenes-vs-microsoft-teams-together-mode/>, Nov. 26, 2020, 3 pages.

Wikipedia entry for "Open Sound Control." Downloaded from webpage: <https://en.wikipedia.org/wiki/Open_Sound_Control>, page last edited on Oct. 26, 2020, 4 pages.

Wonder videoconferencing platform. Wonder features. Downloaded from: https://www.wonder.me/features, download date: May 3, 2021, original posting date: unknown, 5 pages.

Zoom Fully Customizable SDK, downloaded from webpage: <https://marketplace.zoom.us/docs/sdk/custom/introduction>, download date: Dec. 28, 2020, original posting date: unknown, 1 page.

Zoom OSC, Liminal Entertainment Technologies, downloaded from webpage: <https://www.liminalet.com/zoomosc>, download date: Dec. 28, 2020, original posting date: unknown, 2 pages.

* cited by examiner

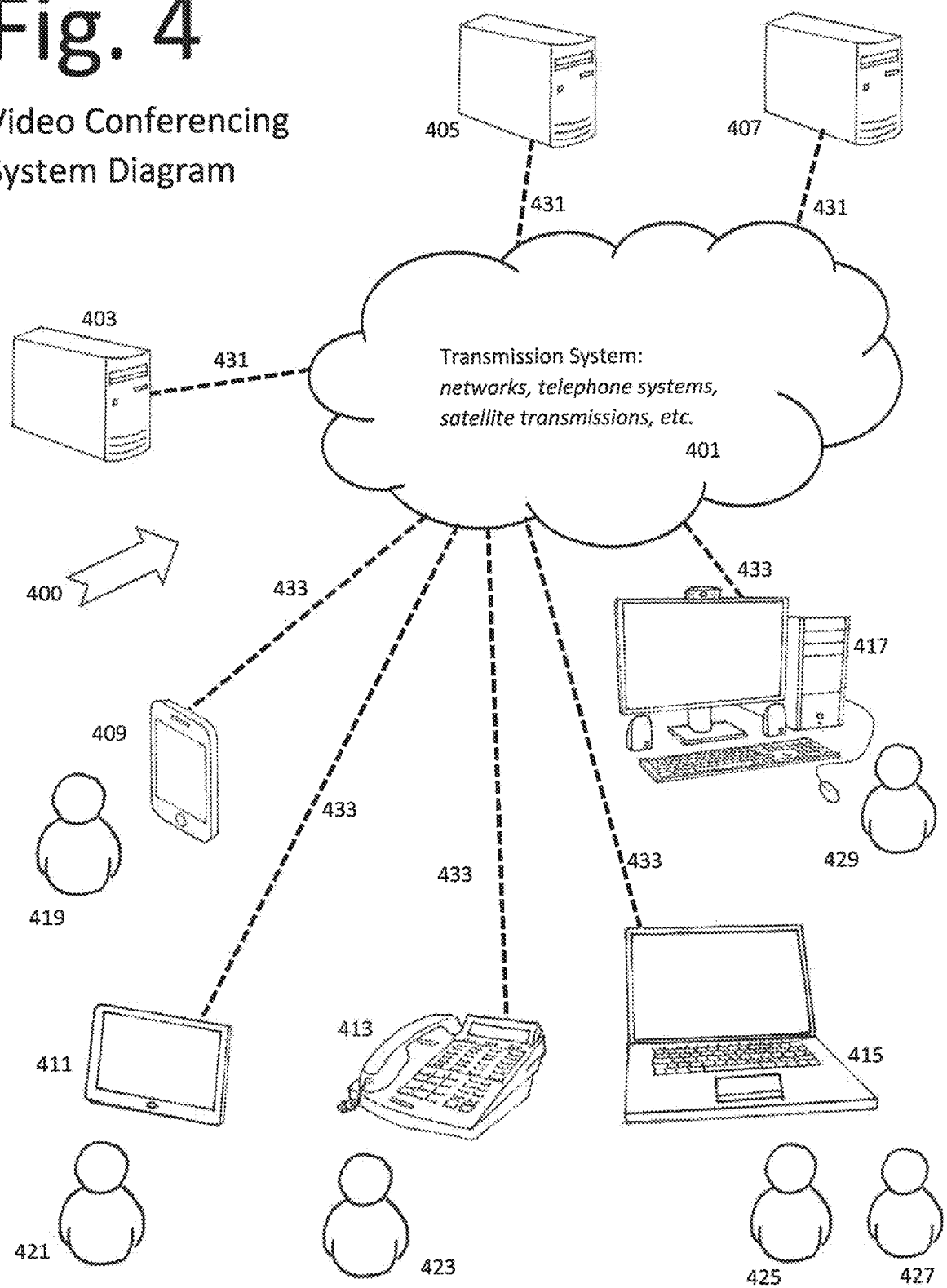

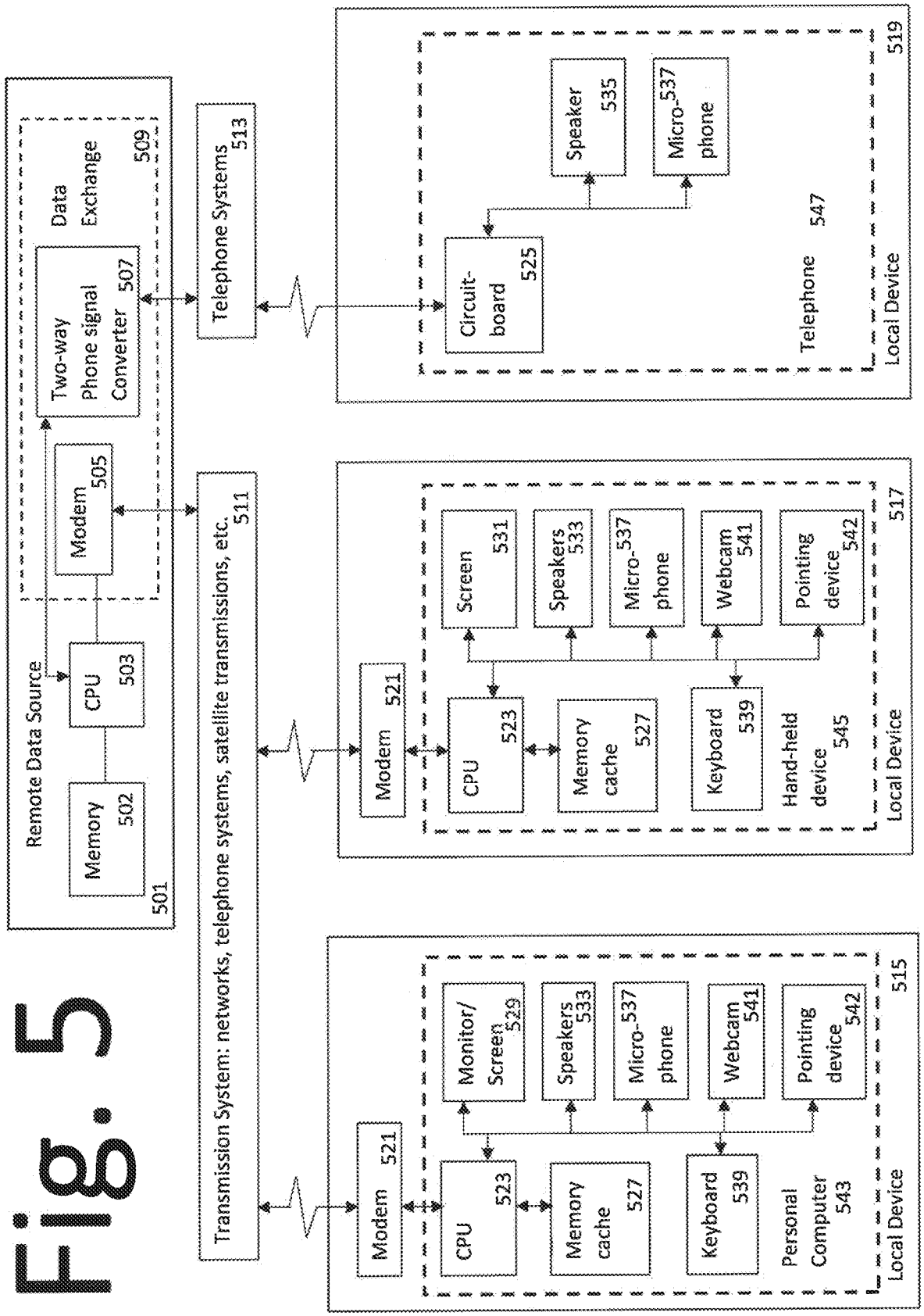

SYSTEM AND METHOD OF ENABLING A NON-HOST, PARTICIPANT-INITIATED BREAKOUT SESSION IN A VIDEOCONFERENCING SYSTEM UTILIZING A VIRTUAL SPACE, AND SIMULTANEOUSLY DISPLAYING A SESSION VIEW OF A VIDEOCONFERENCING SESSION AND THE PARTICIPANT-INITIATED BREAKOUT SESSION

CROSS-REFERENCE TO RELATED APPLICATIONS

This application is a continuation of copending U.S. application Ser. No. 17/569,134 filed Jan. 5, 2022, the disclosure of which is hereby incorporated by reference in its entirety.

This application claims priority to U.S. Provisional Patent Application Nos. 63/134,713 filed Jan. 7, 2021; 63/137,429 filed Jan. 14, 2021; and 63/161,727 filed Mar. 16, 2021, each of which are incorporated by reference herein.

BACKGROUND OF THE INVENTION

The general field of the invention is the use of "breakout rooms" in videoconferencing systems, as well as their software, hardware, and related physical spaces. Videoconferencing systems are used so that people in different locations, physically remote from each other, can hold meetings in real time, both seeing and hearing each other during the meeting. The invention disclosed herein enables participants to generate breakout rooms themselves, for more focused or private discussion and interaction. In addition, it effectuates a fluid continuum of engagement, so that the privacy of a small breakout room is able to retain audio and visual connection with the larger session of which its participants are a part.

"Breakout rooms" or "breakout sessions" split a videoconferencing session into separate videoconferencing sessions. (These two terms will be used interchangeably.) When initially set up, a breakout room may be empty, and then first visited by one sole participant, and in some videoconferencing systems it may be possible for all participants to enter one particular breakout room. However, when a breakout room session is referenced herein, it generally means a separate videoconferencing session that contains a subset of the meeting participants, where a subset of the meeting participants is a plurality of the meeting participants (e.g., at least two), but not all of the meeting participants. Thus, the breakout session participants are a subset of the meeting participants. Generally, the participants in one "breakout room" can communicate with each other in the same way that they would in a regular videoconferencing session, with audio and video feeds of each of them, along with text chat and screen and file sharing capabilities. The host of a session is able to assign participants to specific breakout rooms (in the context of host-initiated breakout rooms). However, in Zoom, the host can choose to allow participants to choose their own breakout room from those set up and initiated by the host. In Zoom's case each participant can be enabled to leave a breakout room to return to the original session or join another breakout room at will. The host can communicate with all participants in all breakout rooms through a broadcast text message. Within a breakout room, a participant may be able to communicate with a host who is not in the breakout room (if this feature is enabled). However, participants in one breakout session cannot communicate with non-host participants in the general session or any other breakout room.

Different videoconferencing systems may permit different numbers of breakout rooms. Zoom currently (Autumn 2020) permits up to 50 to be enabled at one time. In Zoom, the number of breakout rooms are specified by the host, at the time the host initiates them.

Breakout rooms have been conceived and implemented as "either-or" environments. That is, a participant is in one room or another. (In some platforms, a set of virtual breakout rooms replace the original session; in others the original session's "virtual room" continues to exist in addition to the instantiated breakout rooms. However, in all cases a meeting participant is in only one of these virtual rooms, and all (including the virtual room of the original session) will be referred to as breakout rooms.) This is consistent with an enterprise implementation designed to focus participants on work groups and the task at hand. In contrast, more complex online meetings, mediations, and negotiations may require the ability for small subsets of the participants (or small subsets of a sub-group of the participants) to have private "sidebar" discussions for brainstorming, consultation and strategizing. Likewise, more fluid in-person social situations, such as cocktail events, dance parties, holiday celebrations—even if work-related—allow private verbal conversations between participants within the context of a larger social gathering from which those same participants can continue to garner visual and aural social cues and information.

In prior art, it is necessary for a session host to enable and start (that is, initiate) breakout rooms. And, generally, when the host starts breakout rooms, participants are made aware of this through pop-up notification, including a request for them to join the appropriate breakout room. Initially, hosts had to assign participants to breakout rooms, either in real time, or via pre-assignment—or hosts could allow the system to randomly assign participants to breakout rooms. Hosts, and the co-hosts, could join, leave, and rejoin breakout rooms at will, visiting different breakout rooms, or returning to the "main" session, as they wished. When every participant can be designated a co-host (as possible with the Zoom videoconferencing system), then once the host initiates conferences, individuals can join them at will. More recently (Autumn 2020), Zoom introduced a feature (when enabled by the host) that permits all participants to join, leave, or switch breakout rooms, without giving those participants a co-host designation (or co-host abilities).

Recent years have seen an increase in the use of videoconferencing systems and software such as Zoom, Microsoft Team, Intermedia Unite and AnyMeeting, Cisco Webex Meetings, ClickMeeting, Google Meet, Slack, Zoho Meeting, Click Meeting, and JoinMe. Use has exploded during the coronavirus pandemic, with the accompanying shelter-in-place orders, demonstrating both their utility and their limitations on person-to-person interaction.

Such videoconferencing and teleconferencing systems employ the Internet to connect people at physically separate (and distant) locations, by way of each person's computing device at that location. A typical computing device used in a videoconferencing system can include, but is not limited to, a desktop computer, a laptop computer, a workstation, computer server, a smart phone, a tablet computing device, or a specially engineered computing hardware for physical conferencing rooms. In the discussions and descriptions below, mention of a computer or computing device is intended to include any and all of the above, and any similar electronic device which performs similar audio-visual and computational functions.

One of the ways of connecting people is for each computing device to send a live video feed of the person(s) situated at (or in front of) that computing device to the videoconferencing system, using a video camera referred to herein as a "webcam." The webcam may be built into the device (such as with a smartphone or many laptops) or may be a peripheral device connected to the computing device, either physically via cable or wirelessly via WiFi or Bluetooth.

One of the ways that these video feeds are displayed to participants on their computer screens is via a "gallery view" which shows a number of smaller video rectangles of many of the individual video feeds from the people participating in the online meeting. (The look is similar to the old "Hollywood Squares" television program.) The gallery view of other videoconferencing platforms (such as Flymachine) may show the smaller video feeds as hexagons or other non-rectilinear shapes that can also be attached or linked into a chain or mesh rather than a rectilinear grid. The term "thumbnail" will be used to refer to one of these smaller video rectangles, hexagons, or other shapes, which share the computer screen space with at least one more video rectangle, hexagon, or other shape. Putting many or all of the participants' faces on the screen at the same time, attempts to approximate the feeling which a speaking participant has when speaking to a live audience, large or small. It can also create aspects of the ambience of conversing with others at a conference table or in a classroom.

As stated above, the thumbnails need not be rectangles, but could be displayed in other shapes, such as polygons. Flymachine uses hexagons for displaying video feeds of participants who are in breakout rooms. Flymachine displays those who are in conversation together as a linked chain or mesh of hexagons, rather than as a grid of rectangles. As is known to those skilled in the art, borders of, backgrounds within, and space between these video feeds can appear as transparent, to show an underlying image or video feed which they overlay or superimpose.

Note, in contrast to "gallery view", a "speaker view" refers to when the screen shows only (or primarily features) the feed of the person speaking. The videoconferencing system may automatically determine who is speaking and whose feed is shown, or the videoconferencing system may permit the host to determine whose feed will be treated as the speaker (often called "spotlighting"). Although the videoconferencing software may permit the host to specify several panelists in a panel discussion as speakers (e.g., Zoom meeting software permits the host to "spotlight" up to nine speakers), the discussion in this disclosure below will refer to all views that show more than one video feed as a "gallery view".

There are many ways prior art in videoconferencing systems have arranged and organized a gallery view of multiple video feeds on the computer screen.

One set of constraints depends upon factors such as the physical size, shape, and resolution of the participant's computer monitor, as well as the shape and the pixel count of the virtual window on the screen within which the videoconferencing software "operates" and its video feeds are displayed. As is well known to those skilled in the art, programs and their interfaces run within container-objects most often called windows. Windows can be nested within other windows, and depending upon their given properties and the properties of the operating system, they can be resized, moved, overlaid other windows, programmatically or by drag-and-drop operations. As known to those skilled in the art, the color of a window's background can be specified, the background can be specified as transparent (with different opacities), or transparency can be simulated by inheriting the pixel colors of a spawned window's underlying parent.

The constraining "size" of the window, and display of video feeds may depend upon how the user holds the device. For example, based upon the position of a phone's webcam, those who use a smartphone to participate in a videoconference often hold the smartphone in "portrait" mode (that is, the longer side is vertical and the shorter side is horizontal). This affects both the size and shape of the video feed created by the webcam (i.e., in "portrait" mode), as well as the configuration of screen "real estate" available for showing the video feeds of others. In contrast, most laptop and desktop computers deploy a screen in "landscape" mode (that is, the longer side is horizontal and the shorter side is vertical), and their built-in webcams produce video feeds in "landscape" mode sized to fill up the built-in or default-sized screen.

The maximum number of video feeds that can be displayed on the screen may also depend not only on the screen space upon which they are to be displayed, but also on the processing power of the computer displaying them. (Processing power may include processor speeds, auxiliary video processing chips, multiple processing cores, and the like) An additional concern is making sure that video thumbnails will not be so tiny that all sense of recognition and personal connection is lost. This will depend upon the size of the physical screen and how far it is usually held from the user's eye. For an example of the interplay of these two constraints, Zoom currently is designed to simultaneously display up to 4 video feeds on the screen of a smart phone, 9 video feeds on the larger physical screen of a tablet computer, 25 video feeds on the screen of a laptop or desktop computer, and up to 49 video feeds on some higher-powered computers (such as those using Intel i5, 4 core, gen 4 processors).

Note that when there are more video feeds than can be displayed on the screen at one time, the software may produce multiple virtual pages to accommodate additional video feeds or thumbnails, of which the viewer can see only one virtual page at a time. The viewer advances from one page to another by clicking on directional arrows, or (at least with Zoom) sliding a finger along a touch screen in a sideways scrolling motion. In such situations, the videoconferencing software may include an algorithm to always show hosts, co-hosts, panelists, and speakers at the top of the "first" page. The algorithm may also choose to show the viewer's thumbnail on that first page as well, so that the viewer identifies more with the event.

Generally, as more participants join the videoconference, thumbnails of their feeds are added to the gallery view and the videoconferencing software re-arranges the size and position of the video thumbnails—at least until the maximum number of thumbnails (as determined by the algorithm) is displayed. When a participant/user changes the size and shape of the window in which the thumbnail videos are displayed, the videoconferencing software may then re-arrange and/or resize the video thumbnails, also by algorithm. For example, in a videoconference with 8 feeds, if one user has a narrow window in "landscape" mode, the videoconferencing software might display a 2 by 4 array (or grid or matrix) of thumbnail videos, consisting of 2 rows of 4 columns each; whereas if that user were to resize the window to be a narrow one in "portrait" mode, the videoconferencing software might rearrange the thumbnail display into a 4 by 2 array of thumbnail videos consisting of 4 rows of 2 columns each. A videoconferencing system may algorithmically adjust the displayed size of the various feeds in order to fill the entire window in which they are displayed (with different feeds being displayed as different sizes), or all feeds may be displayed at the same size with the algorithm determining how many to fit in the window and how to arrange them, with a background showing in that part of a window not occupied by a video feed. For example, during Summer 2020, Zoom has chosen to display all feeds as the same size, with a black background showing in spaces not filled by video feeds. However, as of Autumn 2020, new features such as Immersive Scenes in Zoom and Together Mode in Microsoft Teams (https://www.uctoday.com/collaboration/team-collaboration/zoom-immersive-scenes-vs-microsoft-teams-together-mode/) have added the use of a still image as a background on which participant video feeds or avatars are overlaid.

The videoconferencing system may give a participant control over some aspects of display of the video thumbnails. For example, if a participant has no webcam (or has turned off the webcam's video feed), a black rectangle labeled with that participant's screen name may be shown instead of a video feed. (Alternatively, a pre-loaded still photograph of the participant may be substituted.) In Zoom, participants can decide not to show thumbnails for those without video feeds. This can be particularly useful, if there are more participants than fit on the screen, but some are joining the conference by telephone, or without video feed.

The arrangement of video thumbnails in gallery view may be determined by an algorithm built into the videoconferencing software. This was the only option with Zoom as recently Summer 2020.

More recently (as of Autumn 2020), Zoom allows a viewer/participant to re-arrange the video thumbnails using drag-and-drop. This re-arrangement affects only that participant's view. However, Zoom also allows the host to override this and force everyone's gallery view to follow the host's video order. In Zoom, this feature is called "Follow Host's Video Order."

During the pandemic, with social distancing and quarantining, videoconferencing platforms were increasingly used to enable online social gatherings, including not only video chats among friends, but online birthday parties, internet game nights, virtual dance parties, and cyber watch-parties for online videos, broadcast sports, esport tournaments, and live-streamed performances. Such online activities were facilitated using share screen features of general platforms like Zoom. However, Zoom and other systems did not include (a) separate audio streams from the streamed events and the watch-party participants, (b) audio mixing mechanisms to enable the audio from the streamed events to be controlled separated from the audio from the watch-party participants, and (c) audio filters or conditioning to prevent the audio from streamed events from interfering with the audio from the participants in the watch-party. For this reason, most watch-party systems only permitted users to communicate via text chat. Watch-parties created via ad hoc user combinations of platforms may have made separate audio streams available, but did not have unified mixing mechanisms or audio filters for the control of feedback from multiple audio streams, requiring users to don headphones. In addition, special purpose social videoconferencing platforms were also developed such as Flymachine for live-streamed events and Apple's SharePlay (released October 2021) for watch parties.

Aspects of current videoconferencing systems are programmable by those knowledgeable in the art, who use these systems to develop novel products and experiences. See for example Zoom's SDK (Software Developer Kit) at https://marketplace.zoom.us/docs/sdk/custom/introduction, which makes raw video and audio data available to the developer. See also the Zoom OSC (Zoom Open Sound Control) developed by Liminal Entertainment Technologies https://www.liminalet.com/zoomosc. For more general information on OSC see https://en.wikipedia.org/wiki/Open Sound Control. Open Broadcaster Software (OBS) can also be used as a virtual camera: https://www.nextofwindows.com/how-to-use-obss-virtual-camera.

SUMMARY OF THE INVENTION

In contrast with other systems and prior art, the present invention discloses how individuals, participating in a videoconferencing session, can easily initiate private conversations via participant-initiated breakout sessions. Using features taught in both preferred and alternate embodiments of the present invention disclosed herein, these private breakout sessions can be either totally separate from the main session, or allow private conversation while the participants in that private conversation are still listening to and viewing the rest of the main session. In this disclosure, "private breakout session" and "participant-initiated breakout session" mean the same and will be used interchangeably.

In the "either-or" paradigm of prior art, a meeting participant only sees participants in his or her breakout room, whether in gallery view or speaker view. In at least one embodiment of the present invention, participants in a private (participant-initated) breakout session see a view (gallery, speaker, or other) of the video feeds of the participants in the videoconferencing session from which they "broke out", as well as and at the same time as they see a separate view of the video feeds of participants in their private breakout session. This second simultaneous view, independent of the view seen by all the participants in the session from which the breakout session broke out or originated, will be referred to as a "participant-initiated breakout session view". In contrast, the term "session view" refers to either a gallery view, a speaker view, or other view of a videoconferencing session of meeting participants from which the participant-initiated breakout room is created. (In this usage, the term "session view" can refer to either (a) the view of the initial videoconferencing session which contains all participants from which a participant-initiated breakout sessions is being created, or (b) the view of a host-initiated breakout session from which another participant-initiated breakout session is being created.)

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4 is a generalized diagram of a videoconferencing system in accordance with one preferred embodiment of the present invention.

FIG. 5 is a schematic view of major components of the videoconferencing system shown in FIG. 4.

DETAILED DESCRIPTION OF PREFERRED EMBODIMENTS

Figure 1:
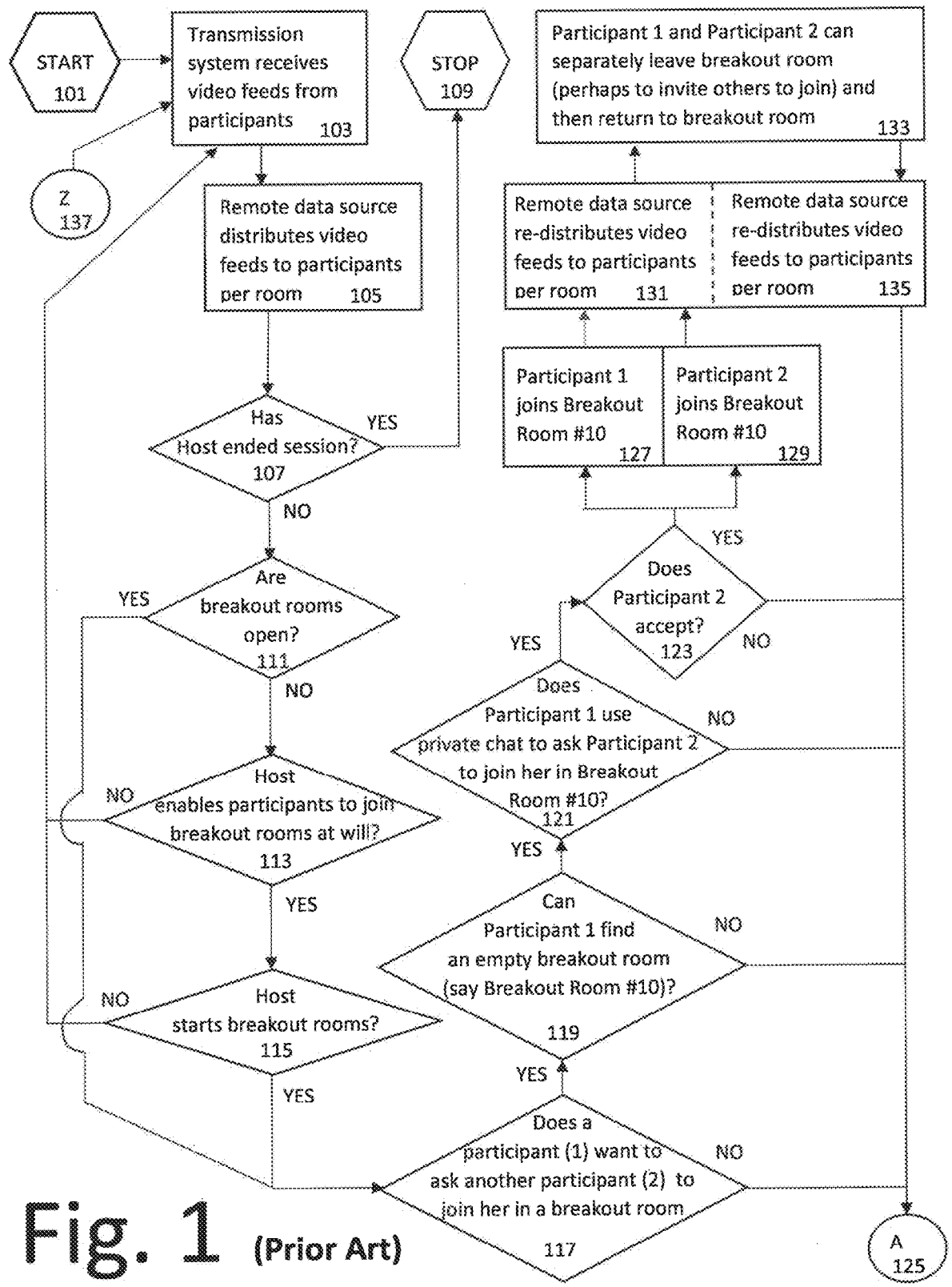
FIG. 1 is a flow chart of prior art technology for a participant to initiate a private breakout room meeting.

Certain terminology is used herein for convenience only and is not to be taken as a limitation on the present invention. The words "a" and "an", as used in the claims and in the corresponding portions of the specification, mean "at least one."

Consider first a description of a generalized teleconferencing/videoconferencing system. The term "videoconferencing" refers not only to conferencing systems with video feeds, but some combination of video and audio feeds. Some connecting devices may have capabilities for both video and audio interactions, whereas others, such as telephones and "non-smart" phones, might have capabilities for audio only (FIG. 4, 413). At times, a user may connect using two devices: one audio only (such as a telephone) and one video only (such as a computer with a webcam but no working microphone).

The term "non-smart" phone refers to telephones which do not have CPUs and do not transmit their signals using modems. A "non-smart" phone is shown in FIG. 5, 547 as well as FIG. 4, 413 (for CPU see FIG. 5, 523 and for modem see FIG. 5, 521). Such phones may be analog, rather than digital, and do not usually have capabilities for receiving or transmitting video, consequently, they frequently do not have a video screen (529) or webcam (541). They usually have only limited flash memory (at most), and not the kind and amount of memory cache, 527, deployed by the present invention.

Of course, more than one person can participate in the conference using the same device, such as two people, 425 and 427, sitting in front of the same laptop computer, 415. This can be the situation for other devices shown (including even a telephone, 413, when it has a speaker instead of or in addition to an earphone). In some cases, specially outfitted physical rooms (not shown) are outfitted with large screen monitors, cameras, speakers, and computing equipment, which perform the same audio-visual display and input-transmission functions as the devices shown. For example, the Zoom company calls rooms outfitted with their equipment "Zoom rooms". A Zoom room permits more than one person—often several people around a table, or even a larger crowd in an auditorium—to join a conference occurring in several locations at the same time.

Nonetheless, even with more than one person in front of and using the same interfacing device, the interfacing device captures only one audio-video stream, so all the people using that device will be referred to collectively, in the description below, as a single "participant" or a single "user".

The interfacing devices are connected to (433) a transmission system (401) and they are connected to each other virtually through a transmission system, 433 and 401. The transmission system, 401, includes, but is not limited to, the Internet and other networks, telephone systems including land line systems, cell phone systems, VOIP (voice over internet protocol) systems, satellite and other radio transmission systems, as well as other wireless transmission systems such as (but not limited to) WiFi and Bluetooth. The interfacing devices may be connected (433) to the transmission system (401) by various ways, including, but not limited to, wire, coaxial cable, Ethernet cable, fiber-optics, WiFi, Bluetooth, and radio transmissions.

Many videoconferencing systems also include one or more computer servers "in the cloud", such as 403, 405, and 407, which are connected (431) to the transmission system, 401. These computer servers may perform all of the video and audio processing for the videoconferencing system (a central processing system) or only some of the video and audio processing (a system with a mixture of local processing and central processing). (Some peer-to-peer videoconferencing systems might not include any such computer servers.) The servers may be multi-purpose, or might have specific capabilities such as data processing or video processing. They may be database servers, web servers, or video streaming servers.

Consider now FIG. 5, which is a more schematic view of the components of the videoconferencing system in FIG. 4. The remote data source, shown in FIG. 5 as 501, might reside on a computer server, such as those shown in FIG. 4. as 403, 405, 407, or without loss of generality, the data might be distributed among them.

The transmission system shown in FIG. 4 as 401, is shown as bifurcated in FIGS. 5 (511 and 513) in part, because the processing and transmission of audio-only signals from "non-smart" phones (547) do not use modems (505 and 521).

The videoconferencing system includes a variety of local devices, with representative examples shown (515, 517, and 519). In particular, consider local device, 515, a personal computer, 543, such as, but not limited to, 415 or 417 in FIG. 4. The local device includes a CPU, 532, a memory cache, 527, used in processing, a monitor or screen, 529, and speakers, 533, to display video and audio, respectively, as well as a microphone, 537, and camera (or webcam), 541, for audio and video input (respectively), along with a keyboard, 539, for alphanumeric input, such as for text chat, and a pointing device or interfaces, 542, such as mouse, trackball, touchscreen, touchpad, or stylus. Note that for many desktop computers, such as pictured in FIG. 4. 417, the monitor, speakers, microphone, webcam, and keyboard are not built into the main housing of the computer as they are in a laptop computer (415), but are connected as accessory peripheral devices. However, they serve the same function, and output to them as well as input from them are processed by the CPU, 523, in the same way. (Other input devices such as pointing devices, 542, as embodied in a touch pad, computer mouse, or touch screen, may be used to control some aspects of a videoconferencing system.)

In general, input to the local device, 515, via keyboard, 539, microphone, 537, webcam, 541, or pointing device, 542, is processed in the CPU, 523. The portion of that input to be sent through the videoconferencing system is then converted by a modem, 521, to signals transmissible through the transmission system, 511.

Local device 517, a handheld device, 545, such as a smart phone (FIG. 4, 409) or tablet (FIG. 4, 411) has the same components: CPU, 523, memory cache, 527, screen, 531, speakers, 533, microphone, 537, webcam 541, keyboard, 539, pointing device, 542, and modem, 521. Input to a handheld device (515) via keyboard, 539, microphone, 537, pointer device, 542, or webcam, 541, is processed in the CPU, 523, stored in memory, 527, and when appropriate, converted in a modem, 521, and sent to the transmission system, 511, in the same process as for local device, 515.

The signals are transmitted through the transmission system, 511, to other local devices, such as 517, or are transmitted to a remote computer server (FIG. 4, 403, 405, or 407) acting as a remote data source, 501. There, during data exchange, 509, the modem, 505, converts the signal to one which can be processed by the server CPU, 503, which may store the signal, in memory, 502, or retrieve data from memory to help with processing, and then resend to the local devices (such as 515 and 517) via modem, 505, and transmission system, 511. When the data signal reaches a local device such as 515 or 517, the modem, 521 (labeled the same in both devices), converts the signal to one that can be processed by the device CPU, 523. The CPU may store some of the data in memory cache 527, or use data from memory cache to process that received data. In any event, the CPU, 523, transmits the signal to the screen, 529 or 531, and speakers, 533, where it is heard by people (FIGS. 4, 419, 421, 425, 427, and 429) in front of the device, 515 and 517.

In contrast, when the local device, 519, is a "non-smart" telephone, 547, the user of the device can only experience the audio portion of the videoconference through the device. Sound from the virtual conference can be heard through the speaker, 535, and input is obtained through the microphone, 537. When receiving input from the microphone, 537, the audio signal is sent to the circuit board, 525, which converts it for transmission via wire or radio wave to the telephone system, 513, which transmits it to a remote computer server, 501, via a data exchange process, 509 and a phone signal converter, 507. After that, the remote data source might process the digital signal in its CPU, 503, possibly storing some of that information in memory, 502. The CPU may also send a processed signal to the phone signal converter 507, then through the telephone system, 513, to a local device, 519, which is a telephone 547. The circuit board, 525, converts the signal to an audio signal and plays it on the speaker, 535.

Consider now FIG. 1, as a review of prior art technology in a videoconferencing system, such as Zoom, for a participant to initiate a private meeting in a breakout room (when this feature has been enabled by the host). The process assumes that as illustrated in FIG. 4 and FIG. 5 (described above), the host has started the videoconferencing session, that participants (419, 421, 423, 427, and 429 in FIG. 4) have logged in, and that video feeds from these participants are being sent from each participant to the system (433), and hence forwarded to all participants with video capabilities— at least until the host ends the session or a particular participant leaves it. Returning to the flow chart in FIG. 1.

At the start (101) of the process, the transmission system received video feeds from the participants (103) noted above. Then per step 105, the remote data source (501 in FIG. 5) transmits and distributes video feeds (through the videoconferencing transmission system, 511 in FIGS. 5 and 401 in FIG. 4) to each participant per the room (or breakout room) which each has joined.

Figure 3A:
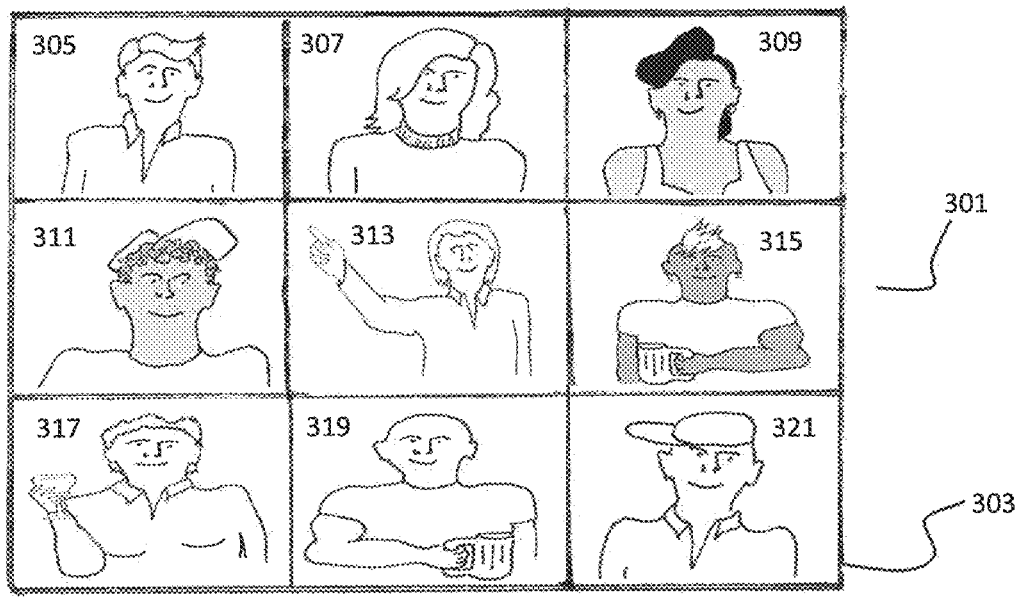
FIG. 3A is a generalized diagram of a computer screen, showing gallery view of the video feeds from nine participants in a videoconference arranged in a 3 by 3 grid.

For example, FIG. 3A shows the gallery view of a videoconferencing session (distributed to all participants in step 105) with at least nine participants (their video feeds being 305, 307, 309, 311, 313, 315, 317, 319, and 321). These feeds are displayed within window, 303, on a computing device screen, 301. There may be additional participants whose video feeds do not "fit" on the screen. Zoom for instance, when used on an iPad will show at most nine participants on a screen. For illustrative purposes in these figures, assume that there are indeed at least several other participants.

If the host has ended the videoconferencing session (107) the process stops (109). If there are no breakout rooms open (111), does the host enable the participants to join breakout sessions at will (113)?

Figure 6A:
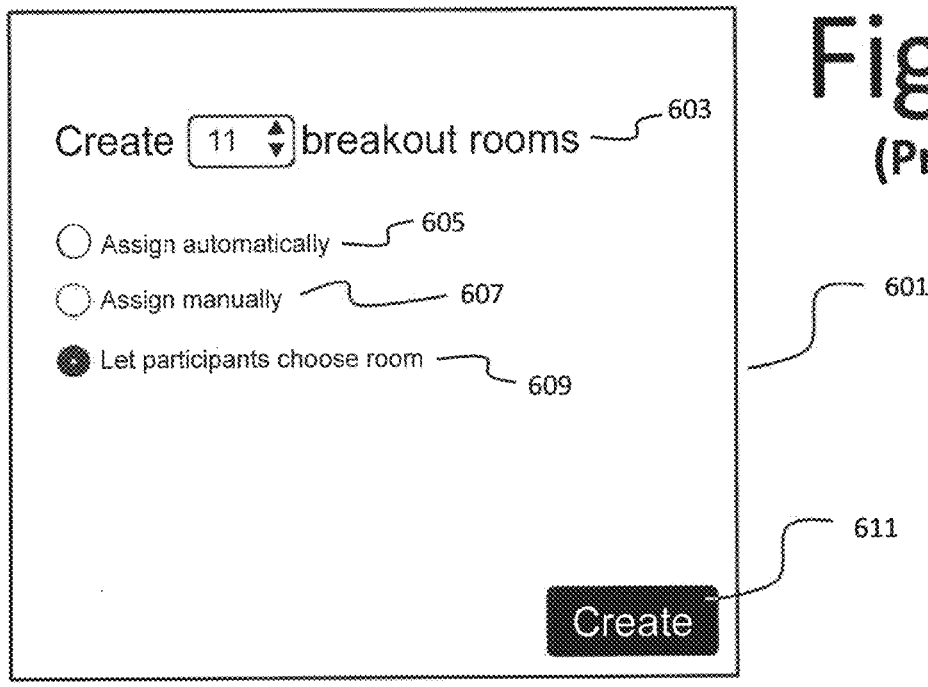
FIG. 6A is an illustration of a window which pops up on the host's computer screen in prior art when the host initiates breakout sessions.

Consider now FIG. 6A. In prior art, when a host wishes to initiate breakout rooms, a window, 601, pops up. The window displays options for the host to choose, such as the number of breakout rooms (603) and whether participants are assigned to the rooms automatically (605) or manually (607), or participants may choose the breakout room they join (609). As known to those skilled in the art, other options are possible, some or all of which are able to be chosen in different or alternate settings displays. Some of these settings (as shown in FIG. 6A) are chosen in the alternative (e.g., by radio buttons). Some of the settings are chosen cumulatively (e.g., by check box). FIG. 6A shows the setting "Let participants choose room" (609) as chosen by the host.

(A videoconferencing system may allow a co-host, in addition to the host, to start breakout rooms. For example, through Summer 2020, Zoom only allowed hosts to start breakout rooms. Subsequently, in Autumn 2020, Zoom permits co-hosts to start breakout rooms as well. In any event, when a co-host is named, and permitted to start breakout rooms, a pop-up window such as FIG. 6A will appear when the co-host seeks to initiate breakout rooms.)

If the host has not enabled participants to join breakout sessions at will, that is, the host has not chosen 609, the process returns to step 103 of FIG. 1 and the process starts over.

Consider when the host has enabled participants to join breakout sessions at will (113 and as shown in FIG. 6A). If the host does not start breakout rooms (115), such as by activating a "Create" control (e.g., the one shown as 611 in FIG. 6A), the process returns to step 103 and starts over. Otherwise, after step 115, the system announces to participants that they may join breakout rooms (step not shown) and the process proceeds to step 117.

Going back to step 111. If breakout rooms are already open, the process proceeds directly to step 117.

When breakout rooms are open, and participants may join them at will, the issue is whether any participant (without loss of generality, say Participant 1) wants to ask another participant (without loss of generality, say Participant 2) to join him or her in a breakout room (117). If no participant wants that, the process continues via node A (125) and Z (137), back to step 103 and the process starts over.

Otherwise, Participant 1 must find an empty breakout room (119). If none are available, the process continues via node A (125) and Z (137), back to step 103 and the process starts over.

If a breakout room is available (without loss of generality, say Breakout Room #10), 119, Participant 1 uses the videoconferencing chat function to ask Participant 2 to join her in the specified Breakout Room #10 (121). Note, this request must be made before either participant joins a breakout room, because once in a breakout room, a participant outside the room can't communicate with someone inside—and visa versa. Participant 1 will most likely use private chat to Participant 2, because Participant 1 is only asking that one other person, Participant 2, join her in the breakout. If Participant 1 does not ask Participant 2 to join the room, the process continues via node A (125) and Z (137), back to step 103 and the process starts over.

If Participant 1 makes the request (121) and Participant 2 replies "No" (123), the process flows through node A (125) and Z (137), back to step 103 and the process starts over.

On the other hand, if Participant 2 accepts the invitation (123), then Participant 1 joins Breakout Room #10 (127) contemporaneously with Participant 2 joining Breakout Room #10 (129). With these joinings, the system registers the new distribution of participants among rooms (and breakout rooms), and re-distributes the video feeds of participants in the various rooms to the participants in those rooms (131). More specifically, the remote data source, 501 in FIG. 5, (a) sends the video feed of Participant 1 to Participant 2 and visa versa, (b) sends their video feeds to no other participants, and (c) sends the video feeds of no other participants to Participants 1 and 2.

Figure 3B:
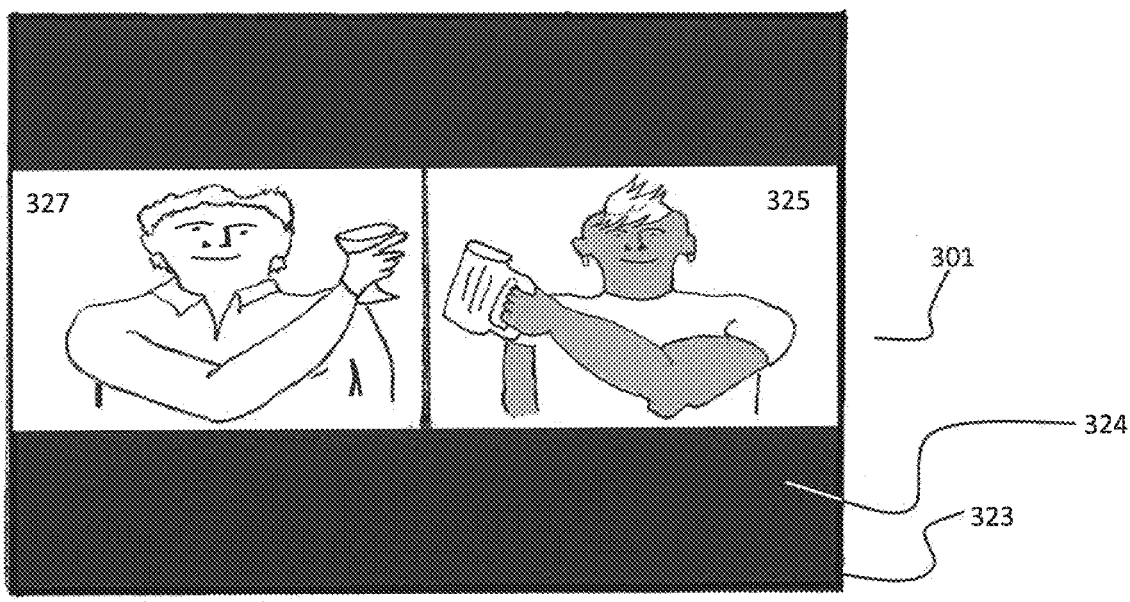
FIG. 3B is a generalized diagram of a computer screen, showing gallery view of the video feeds from two participants from FIG. 3A, who have arranged a private breakout session according to either prior art (as described in FIG. 1) or the teachings of the present invention.
Figure 3C:
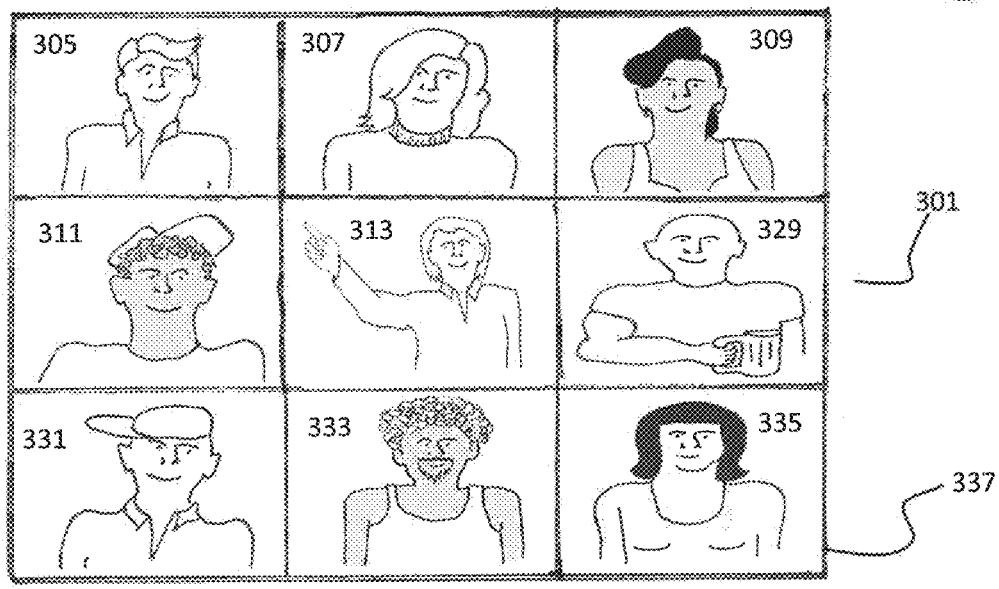
FIG. 3C is a generalized diagram of a computer screen, showing gallery view of the video feeds from nine participants in a videoconference after the two participants shown in FIG. 3B have left for their own breakout session.

Consider FIG. 3B and FIG. 3C. First, using FIG. 3A as an example, let Participant 1 be the person whose video feed is 317 and let Participant 2 be the person whose video feed is 315. Then in step 131, the breakout room with these two people is illustrated by FIG. 3B, a moment later when the two participants have changed positions. Participant 1 is shown in video feed 327 and Participant 2 is shown in video feed 325. These two feeds are displayed in window 323 on computing device screen 301. These two feeds do not fill the whole window, the background of the window, 324, has been specified by the system as black.

Consider the video feeds distributed in step 131 to participants other than Participant 1 and Participant 2. FIG. 3C illustrates a gallery view of the video feeds shown to other participants, in window, 337, on computing device screen, 101. These do not include the video feeds of Participant 1 and Participant 2. The video feeds of remaining participants (305, 307, 309, 311, 313, 329, 331) are re-ordered, and video feeds of additional participants (333 and 335) are added. (Note, video feeds numbered 305, 307, 309, and 311 in both FIG. 3A and FIG. 3C are of the same people and have the same order position in the gallery view as sent in step 131. Additionally, video feed 329 in FIG. 3C is the same as 319 in FIG. 3A, but re-ordered, and video feed 331 in FIG. 3C is the same as 321 in FIG. 3A, but re-ordered. Video feeds 333 and 335 in FIG. 3C are from participants in the videoconference session, but not shown on the screen in FIG. 3A.)

Note, the videoconferencing system may send the video feed of a participant back to that participant, or might conserve system bandwidth by not doing that, instead rather capturing, processing and displaying a participant's video feed locally, while transmitting to the videoconferencing system for display to others. Note also, that step 131 is essentially the same step or subprocess as step 105 (and 135).

At this point in the process, the breakout room with Participants 1 and 2, has been established. Either or both may leave the breakout room (133). Either or both may join a different breakout room or the "main" session room (if that feature is enabled). In fact, if they want to ask another participant (without loss of generality, say Participant 3) to join them in Breakout Room #10, at least one will have to find Participant 3, join the room where Participant 3 is and then ask him or her (via verbal speech or chat) to join them in Breakout Room #10.

In any event, when one or both (of Participants 1 and 2) leave Breakout Room #10, the remote data source and transmission system redistributes the video feeds (135), so that everyone in each room receives the video feeds of those in the room and no others. Again, note that step 131 and 135 are identical. At this point the process flows through node A (125) and Z (137), back to step 103 and the process starts over.

A variation of prior art employs the abilities of co-hosts to join breakout rooms at will. To construct a flow chart for this variation, re-label the decision point 133 to read "Host names all participants as co-hosts". The rest of the chart remains the same.

This use of prior art as described in FIG. 1 is not obvious or intuitive to those skilled in the art. In order for the host to create the opportunity for participants to set up private breakout sessions, by finding empty breakout rooms, the host must (a) intentionally choose enough extra breakout rooms (election 603 in FIG. 6A per step 113 and 115 of FIG. 1) that at any time, some rooms will likely be empty, and (b) tell participants about this opportunity. In other words, setting up a few breakout session rooms (such as rooms named for specific discussion topics) will likely not be sufficient. One solution with prior art is to set up a room for each participant, named for that participant. That way the participant can invite another (or others) to "her" named room. Another solution is to give every participant a number and change each participant's screen name to include that number, e.g., "John Jones—23". Then each participant can ask others to come to "his" numbered room (that is John Jones could ask another participant to come to breakout room #23). However, one breakout room per participant is more rooms than needed, because each private breakout consists of at least two people.

This use of prior art to enable "private" breakout rooms is not efficient, and of only limited and transient privacy. Notice how the prior art requires searching and messaging by Participant 1, and that the act of gathering a small group into one breakout room can be iterative and time consuming. Importantly, this prior art breakout room is not truly "private" except when started. Others can join this breakout room at anytime, including the host and co-host, even if not invited.

Some videoconferencing platforms, such as Wonder and Gatherly, are based on a virtual space in which breakout groups are created differently. In these platforms, every participant is given an icon or avatar within the virtual space. When two icons are close together (within that virtual space), they can hear each other's audio, otherwise they can't. Proximity in the virtual space is used to create conversations and breakout rooms (sometimes called circles). Two participants can hold a private conversation by "standing" next to each other, though this may require moving out of their current conversation circle. However, one proposed spatial videoconferencing platform disclosed in U.S. Patent Application Publication No. 2021/0352244 (Benedetto et al.) also includes a "whisper" function, so that one participant in a breakout room can speak privately with another participant in that breakout room, without others hearing, but still within the same set of breakout room video feeds. Benedetto et al. is discussed in more detail below.

Figure 2:
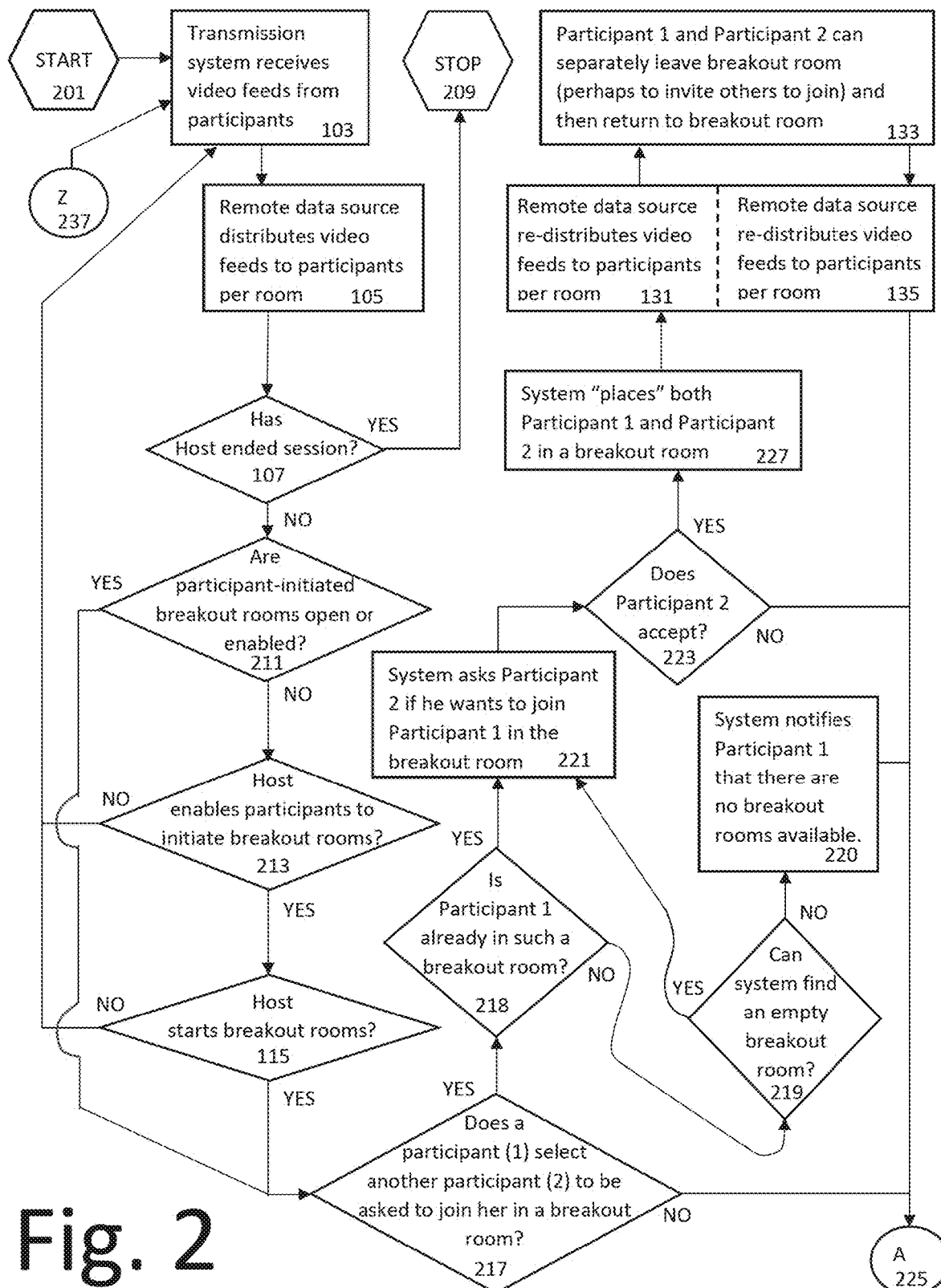
FIG. 2 is a flow chart of a participant initiating a private breakout room using a preferred embodiment of the present invention.

In contrast consider now FIG. 2, a flow chart of a preferred embodiment of the invention. Again, the process assumes that as illustrated in FIG. 4 and FIG. 5 (described above), the host has started the videoconferencing session, that participants (419, 421, 423, 427, and 429 in FIG. 4) have logged in, and that video feeds from these participants are being sent from each participant to the system (433), and hence forwarded to all participants with video capabilities—at least until the host ends the session or a particular participant leaves it. Returning to the flow chart in FIG. 2. Steps that are identical in FIG. 1 and FIG. 2 will frequently be labeled with the same number.

At the start (201) of the process, the transmission system received video feeds from the participants (103) noted above. Then per step 105, the remote data source (501 in FIG. 5) transmits and distributes video feeds (through the videoconferencing transmission system, 511 in FIGS. 5 and 401 in FIG. 4) to each participant per the room (or breakout room) which each has joined.

Again, FIG. 3A shows the gallery view of a videoconferencing session sent to all participants in step 105 in FIG. 2, with at least nine participants (their video feeds being 305, 307, 309, 311, 313, 315, 317, 319, and 321). These feeds are displayed within window, 303, on a computing device screen, 301. The video feeds of additional participants are not shown on the screen in this figure.

If the host has ended the videoconferencing session (107 in FIG. 2) the process stops (209). If there are no participant-initiated breakout rooms open or enabled (211), a new decision point 213 is reached, concerning the new feature, enabling participants to initiate breakout rooms on their own.

Figure 6B:
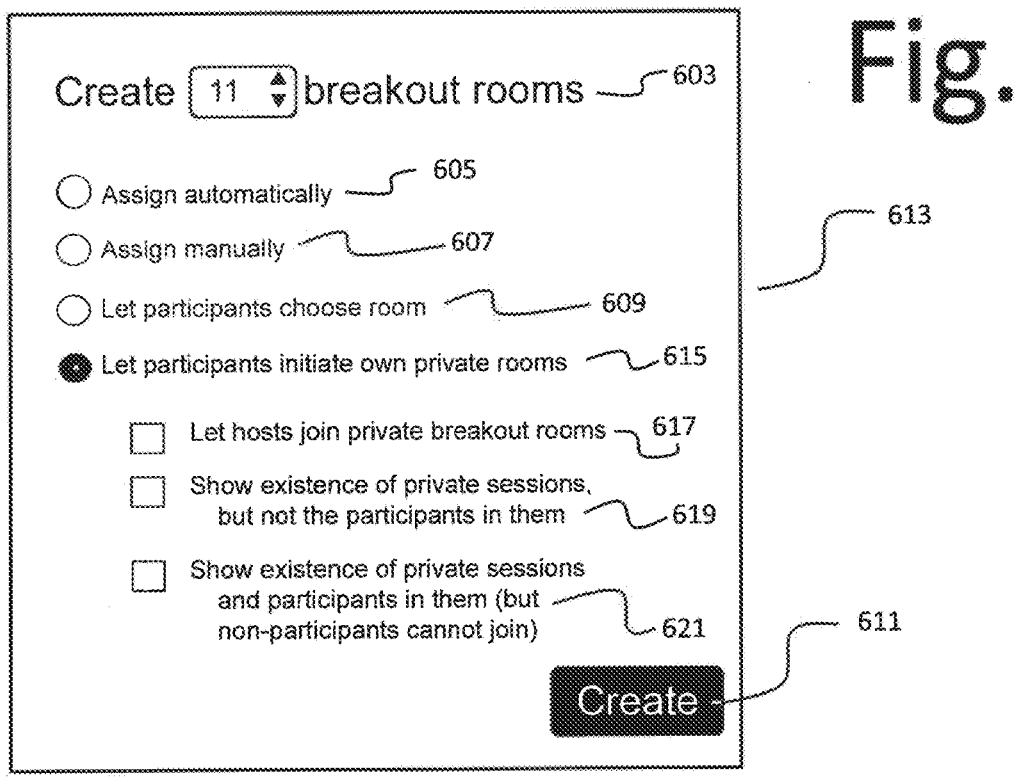
FIG. 6B is an illustration of a window which pops up on the host's computer screen in a preferred embodiment of the present invention when the host initiates breakout sessions.

Consider now FIG. 6B. When a host wishes to initiate breakout rooms, a window, 613, pops up. The window displays options for the host to choose, such as the number of breakout rooms (603) and whether participants are assigned to the rooms automatically (605) or manually (607), or whether participants may choose the breakout room the join (609) or initiate their own private breakout rooms (615). In addition to primary options (such as 603, 605, 607, 609, and 615), FIG. 6B shows a secondary option (617) that can be chosen only if a specific primary option (615) has been chosen. As known to those skilled in the art, secondary options are often programmed to appear only after the appropriate primary option has been chosen. In a preferred embodiment of the invention, the host may choose whether or not to allow a host (or co-host) to join private breakout sessions (617). When private breakout rooms are enabled and created, the pop-up window informs users whether or not the host (and co-hosts) can join a private breakout session.

As known to those skilled in the art, other options are possible, some or all of which are able to be chosen by using different or alternate settings input forms. Some of these settings (as shown in FIG. 6B) are chosen in the alternative (e.g., by radio buttons). Some of the settings are chosen cumulatively (e.g., by check box). FIG. 6B shows the setting "Let participants initiate own private rooms" (615) as chosen by the host. FIG. 6B also shows that the option "Let hosts join private breakout rooms" (617) as not enabled (not chosen). Different hosts will choose differently among these and other possible options, as mentioned in this disclosure and known to those skilled in the art.

In a preferred embodiment, when a participant initiates a private breakout session, others cannot see a listing for that private session (that is, it is not named in a pop-up listing of breakout sessions) or who is in it (619). In an alternative embodiment, others can see that a private session has started, but not who is in it. In another alternative embodiment, others can see that a private session has started, and who is in it, but cannot join it (621). As is understood by those skilled in the art, various features can be combined to give different degrees of privacy to the breakout session, and from which part of the videoconference such a session can be initiated (that is, in some embodiments, it can be initiated only from a main session, whereas in others a private session can be initiated from within another breakout session).

(As mentioned above, a videoconferencing system may allow a co-host, in addition to the host, to start breakout rooms. When a co-host is named, and permitted to start breakout rooms, a pop-up window such as FIG. 6B will appear when the co-host seeks to initiate breakout rooms.)

If the host has not enabled participants to initiate breakout sessions on their own (step 213 choosing 615 of FIG. 6B), the process returns to step 103 in FIG. 2 and the process starts over.

Consider when the host has enabled participants to initiate breakout rooms (113). If the host does not start breakout rooms (115) the process returns to step 103 and starts over. Otherwise, after step 115, the system announces to participants that they may initiate and join breakout rooms (step not shown). This announcement also informs participants concerning privacy of the breakout rooms that they can initiate, including whether the room will be private, whether the room will be hidden to other participants, and whether hosts, co-hosts, or others can join without invitation. Then the process proceeds to step 217.

Going back to step 211. If participant-initiated breakout rooms are already open or enabled, the process proceeds directly to step 217.

When breakout rooms are open, participants may initiate them on their own (starting at step 217). Decision point 217 is similar to 117 in FIG. 1. The decision point in 217 in FIG. 2 asks: Does any participant (without loss of generality, say Participant 1) want to ask another participant (without loss of generality, say Participant 2) to join him or her in a breakout room (217)? However, the ask/request is more direct than in 117 (see below). But again, if no participant wants to make the request, the process continues via node A (225) and Z (237), back to step 103 in FIG. 2 and the process starts over.

Consider now one participant asking another to join her in a breakout room.

To make the ask/request in a preferred embodiment, a participant selects (e.g., clicks on) the control icon for "breakout rooms". The participant will see a list of open rooms (in the preferred embodiment this is only the "main" room, but in alternate embodiments, this may include non-private breakout rooms as well), along with names of users in each room. Each room may have a "join" button, which enables the participant to join that particular room. In addition, when the participant selects any particular name (e.g., by clicking on it), a dropdown list permits the participant to check that user as one to be asked to join a breakout room.

(In a preferred embodiment, if a participant is already in a private, unnamed breakout room, that participant's name would not appear in these various participant lists.)

In an alternative embodiment, the number of users that a participant can check is limited.

In another alternative embodiment, the participant selects users to invite by clicking on the "participants list" icon, and selecting from that participant list. In another alternative embodiment, the participant selects users to invite by clicking on the options button associated with the user's thumbnail video feeds. For Zoom, there is an optional actions button, that appears when the participant moves his or her mouse over the upper right-hand corner of the video feed or its thumbnail. Both of these types of controls are used by Zoom as alternate ways for a participant to pin a user's video. In an alternative embodiment of the present invention, all these various control locations are available for a participant to select for the system to ask if other participants want to join the first participant in a private breakout room.

As is well-known to those skilled in the art, there are other controls, otherwise named, which can be used to select users to be asked to join a breakout room.

In a preferred embodiment the present invention illustrated in FIG. 2, (and for comparison with FIG. 1 prior art), a participant (Participant 1) can ask only one other participant (Participant 2) to join a breakout room.

If Participant 1 selects Participant 2 to be asked (217), and has previously been placed in a private breakout room, perhaps already with another participant (218), then the process proceeds to step 221.

Otherwise, the videoconferencing system, having been notified of the request, checks to see if there are any empty breakout rooms, 219. (Note that for Zoom, a standard subscription accommodates 100 participants and 50 breakout rooms, so there would always be enough rooms for any two people to meet. This step is not about finding real physical rooms, but ascertaining the pre-set processing capabilities to transmit and allocate video feeds.) If none are available, the system notifies Participant 1 that no breakout rooms are available, 220. Then the process continues via node A (225) and Z (237), back to step 103 and the process starts over.

If the system finds an available breakout room, 219, the system sends a notice to Participant 2, asking if he wants to join Participant 1 in a breakout room, 221.

At step 221, in a preferred embodiment this notice is in the form of a pop-up window within which are the words, "Do you want to join a breakout room with [Name of Participant 1]?" plus a selectable button labeled "Yes" and a selectable button labeled "No". In an alternative preferred embodiment, there is only one selectable button labeled "Join", and the pop-up window disappears in 5 seconds. In alternate preferred embodiments, the wording and transience differs but conveys the same intent.

If Participant 2 does not accept, 223, the process flows through node A (225) and Z (237), back to step 103 and the process starts over.

On the other hand, if Participant 2 accepts the invitation (223), the system places Participant 1 and Participant 2 in a breakout room (227). Unlike with prior art, the room need not be publicly identified for others to find and join. With this creation and population of a new virtual breakout room, the system registers the new distribution of participants among rooms (and breakout rooms), and re-distributes the video feeds of participants in the various rooms to the participants in those rooms (131). More specifically, the remote data source, 501 in FIG. 5, (a) sends the video feed of Participant 1 to Participant 2 and visa versa, (b) sends their video feeds to no other participants, and (c) sends the video feeds of no other participants to Participants 1 and 2.

Again, consider FIG. 3B and FIG. 3C. First, using FIG. 3A as an example, let Participant 1 be the person whose video feed is 317 and let Participant 2 be the person whose video feed is 315. Then in step 131 in FIG. 2, the breakout room with these two people is illustrated by FIG. 3B, a moment later when the two participants have changed positions. Participant 1 is shown in video feed 327 and Participant 2 is shown in video feed 325. These two feeds are displayed in window 323 on computing device screen 301. These two feeds do not fill the whole window, the background of the window, 324, has been pre-specified by the system as black.

Consider the video feeds distributed in step 131 in FIG. 2 to participants other than Participant 1 and Participant 2. FIG. 3C illustrates a gallery view of the video feeds shown to other participants, in the application window, 337, on computing device screen, 101. These do not include the video feeds of Participant 1 and Participant 2. The video feeds of remaining participants (305, 307, 309, 311, 313, 329, 331) are re-ordered, and video feeds of additional participants (333 and 335) are added. (Note, video feeds 305, 307, 309, and 311 are in both FIG. 3A and FIG. 3C. The numbered feeds are of the same people and have the same order position in the gallery view as sent in step 131. Additionally, video feed 329 in FIG. 3C is the same as 319 in FIG. 3A, but re-ordered, and video feed 331 in FIG. 3C is the same as 321 in FIG. 3A, but re-ordered. Video feeds 333 and 335 in FIG. 3C are from participants in the videoconference session, but not shown on the screen in FIG. 3A.)

Note, the videoconferencing system may send the video feed of a participant back to that participant. Alternately, the system may conserve system bandwidth by instead capturing, processing and displaying a participant's video feed locally, while transmitting to the videoconferencing system for display to others. Note also, that step 131 in FIG. 2, is essentially the same step or subprocess as step 105 (and 135) in FIG. 2.

At this point in the process, the breakout room with Participants 1 and 2, has been established. Either or both may leave the breakout room (133). Either or both may join a different breakout room (if that feature has been enabled) or the return to the "main" session room.

However, in an alternative embodiment, for either Participant 1 or Participant 2 to invite Participant 3 to join them, one will have to find Participant 3 and join the session or breakout room where Participant 3 is located in order to deliver the invitation.

In any event, when one or both (of Participants 1 and 2) leave the breakout room, the remote data source and transmission system redistributes the video feeds (135), so that everyone in each room receives the video feeds of those in the room and no others. Again, note that step 131 and 135 are identical. At this point the process flows through node A (225) and Z (237), back to step 103 in FIG. 2 and the process starts over.

In an alternative preferred embodiment, a participant can ask more than one other participant to join a breakout room. The selection is made in step 217, by Participant 1 selecting more than one name from those listed in the breakout room listing. In step 221, the system asks all participants selected if they want to join Participant 1 in a breakout room. If no one accepts (in revised step 223), the process flows through node A (225) and Z (237), back to step 103 and the process starts over. Otherwise, in revised step 223 and revised step 227, the system "places" those users who accept the request into a breakout room with Participant 1. Otherwise, the steps remain the same as shown in FIG. 2.

In an alternative embodiment, step 227 of FIG. 2 is replaced by "System spawns an additional window on the computing devices being used by Participant 1 and Participant 2." This new window is within the existing window and overlays it, while this new overlaying window has a transparent background. The System "places" both Participant 1 and Participant 2 in a breakout room, the video feeds for which are displayed in this new window on the computer screens of Participant 1 and Participant 2. The underlying window continues to display video feeds for the original session. Then in step 131, the Remote Data source redistributes video feeds to participants per room.

Figure 3D:
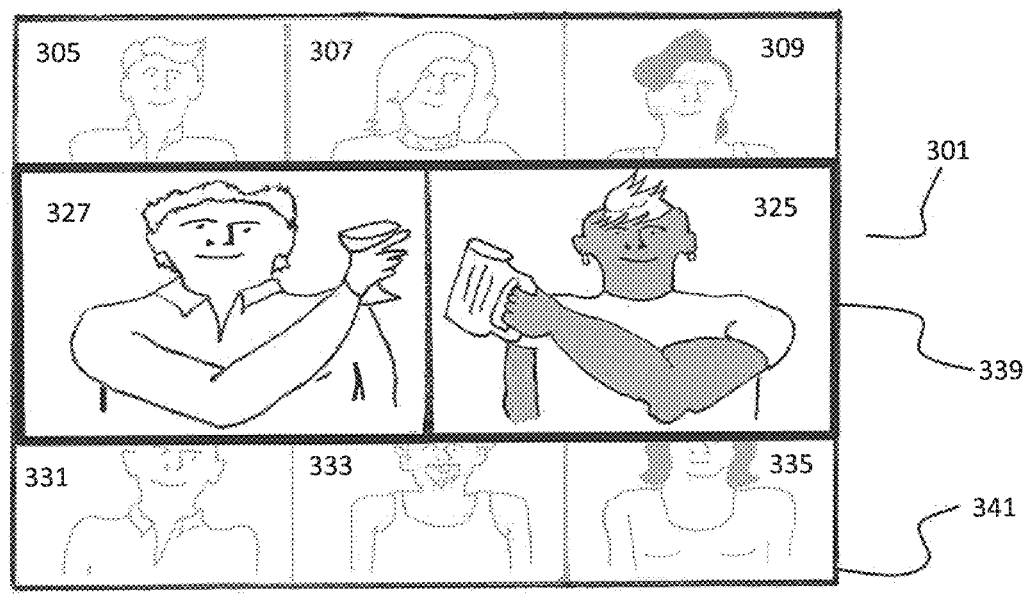
FIG. 3D is a generalized diagram of a computer screen, showing an alternative embodiment of the present invention in which the video feeds of the participants in the breakout room window (FIG. 3B) are superimposed over a gallery view of the participants who remain in the session (FIG. 3C).

This is illustrated in FIG. 3D. In revised step 227, the new window, 339, overlays the old window, 341 in FIG. 3D (303 in FIG. 3A), on the screen 101 of the computing device. Then in step 131 of FIG. 2, the video feeds of Participant 1 and Participant 2 (325 and 327 of FIG. 3D) are displayed in window 339, while the video feeds of the other participants (as shown in FIG. 3C) are displayed in the underlying window 341 in FIG. 3D (which is the same display as shown in window 337 in FIG. 3C). Window 339 has a transparent background, so some of the video feeds in the underlying window 341 are displayed through the transparency, while others are covered by the video feeds in 341.

This embodiment enables Participant 1 and 2 to have a private conversation while still seeing what is happening in the main session. The video feeds from the main session are displayed using the same color settings as those in the breakout room. In an alternative embodiment, using methods well known to those skilled in the art, the video feeds are displayed with filters to differentiate the video feeds for the main session from the video feeds for the breakout session. For example, the video feeds from the main session are displayed in black and white or sepia, while the video feeds in the breakout session are displayed in color. This allows those in the breakout room to focus on those in the breakout room, while retaining visual connection with those in the main session.

In a preferred embodiment these filters are set by the host. In an alternative embodiment, these filters are set by individual participants. (Note: in Zoom, individual participants can set filters for their own feed, but not others' feeds.) In a preferred embodiment the transparency of the background is 100%, whereas in an alternative embodiment, the transparency is set by the host between 0% and 100%. In an alternative embodiment, the methods of which are known to those skilled in the art, the transparency is set by the individual participants. In this embodiment, with control of transparency in the hands of individual users, they can adjust the visual connection from strong to non-existent.

In an alternative preferred embodiment, the video feeds of Participant 1 and Participant 2 (325 and 327 of FIG. 3D) are displayed in window 339, while the video feeds of the all participants in the original breakout room (or conversation sess) including Participant 1 and Participant 1 are displayed in the underlying window 341 in FIG. 3D (which is the same display as shown in window 337 in FIG. 3C). This lets the other participants in the room know that Participant 1 and Participant 2 are still observing the conversation.

Figure 3E:
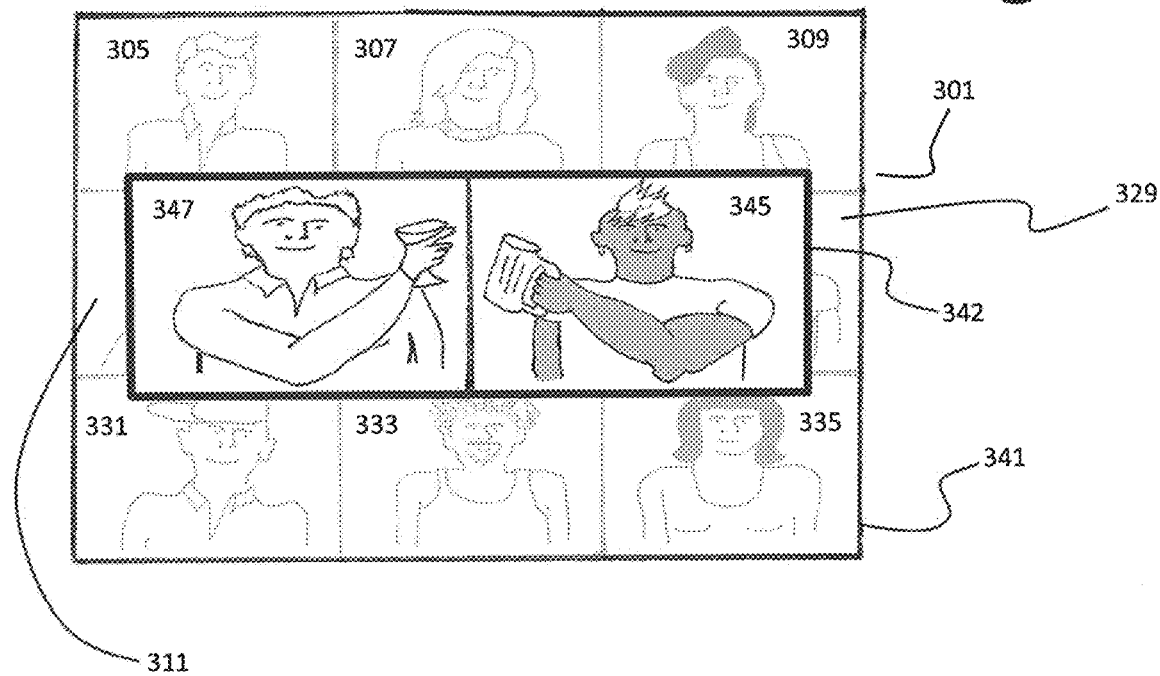
FIG. 3E is a generalized diagram of a computer screen, showing an alternative embodiment of the present invention in which the video feeds of the participants in the breakout room window (FIG. 3B) are resized and superimposed over a gallery view of the participants who remain in the session (FIG. 3C).
Figure 3F:
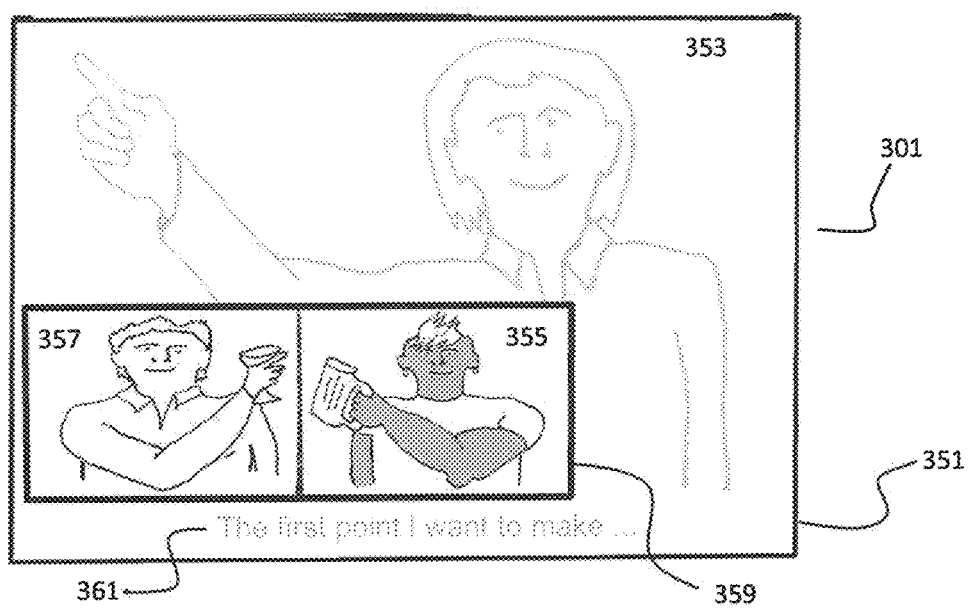
FIG. 3F is a generalized diagram of a computer screen, showing an alternative embodiment of the present invention in which the video feeds of the participants in the breakout room window (FIG. 3B) are moved, resized, and superimposed over a speaker view of a presentation with closed captions being held in the "main" session of the videoconference.

In an alternative embodiment, as illustrated in FIG. 3E and FIG. 3F, using methods known to those skilled in the art, the user can move and resize the window for the breakout session without resizing the window for the main session, thus showing a larger portion of the video feeds from the main session. For example, in FIG. 3E, the user has decreased the size of breakout window 339 of FIG. 3D to the window 342 of FIG. 3E, while the window of the main session, 341 in both FIG. 3D and FIG. 3E, remains the same. In FIG. 3F, the user has both resized the breakout session window, and also moved the relative position of the breakout session window, 359.

In a preferred alternative embodiment, the window of the new breakout room (342 in FIG. 3E and 359 in FIG. 3F) is instantiated as an independent window which a participant resizes and repositions at will, and which the participant can place in front of (or overlay) the window of the original breakout room (or conversation session).

In an alternative embodiment, as also illustrated in FIG. 3F, using methods known to those skilled in the art, the user may change the view of the main session from gallery (shown in FIG. 3E) to speaker (shown in FIG. 3F as one of the participants in the main).

To be more specific, FIG. 3F shows the private breakout session in window 359, with two video feeds: 357 in FIG. 3F begin a resized and repositioned video feed from the same participant as 347 in FIG. 3E; and 355 in FIG. 3F being a resized and repositioned video feed from the same participant as 345 in FIG. 3E. This breakout session window (359) with transparent background overlays the video feed from the main session in window 351, which is a speaker view of one of the participants in the main session. This video feed, 353, is the speaker view of the video feed shown as 313 in FIG. 3C (the continuing main session gallery view) as well as 313 of the initial FIG. 3A. Both windows (359 and 351) are displayed on computing device screen 301.

FIG. 3F also shows an embodiment with closed captioning (361) of the words of the speaker in the main session. Videoconferencing systems (such as Zoom) provide various options for closed captioning via live transcribers or third-party services, with user controls for turning the closed captioning on or off (when provided). With respect to this embodiment, as known by those skilled in the art, this control (not shown in FIG. 3F) used by a private breakout room participant to access those closed captions created for the main session, is added to the program interface when the private breakout room participants also access the speaker view window for the main session.

This discussion has focused on the initiation of a private breakout room between Participant 1 and Participant 2, but as is obvious to those skilled in the art, Participant 1 and Participant 2 can ask others to join their private conversation (see step 133 in FIG. 2). In addition, multiple participants can each initiate a private breakout room, using the process disclosed in FIG. 2 and discussed above, so that a plurality of simultaneous private breakout rooms are initiated from the original session.

Note that with prior art, Participant 1 and Participant 2 can remain in a main session, listening to the speaker's audio, while using text chat to converse with each other. In contrast, when using the embodiment of the present invention shown in FIG. 3F, Participant 1 and Participant 2 can converse verbally with each other, while absorbing a text rendition of the speaker's words.

In a preferred alternative embodiment, the videoconferencing platform employs sound cancellation techniques, such as those disclosed in U.S. Pat. No. 11,107,490 (Slotznick), which is incorporated by reference herein, so that Participant 1 and Participant 2, while talking to each other in their own breakout room (e.g., 342 in FIG. 3E or 359 in FIG. 3F), can also listen to the audio from the underlying breakout room or videoconferencing session (e.g., 341 in FIG. 3E or 351 in FIG. 3F).

(Slotznick accomplishes this sound cancellation by copying the audio from the underlying breakout room and then removing it from any audio input from Participant 1 and Participant 2. Krisp performs similar sound cancellation (as of Fall 2021) by using artificial intelligence to profile each participant's voice, and removing everything else from the audio input. Efficacy is increased using a combination of the two methods.)

This is similar in some respects to the whisper feature in Benedetto et al. However, Benedetto et al. teaches away from the present preferred alternative embodiment, first, because Benedetto et al. does not spawn a new window for the whispered conversation, and second, because Benedetto et al. only teaches one whispered utterance at a time from one participant at a time to one other participant. In contrast, the present preferred alternative embodiment permits a fluid ongoing conversation between two or more participants while they still hear the audio from the underlying breakout room or videoconferencing session.

In another alternative embodiment, the host designates which participants can invite others to join in a participant-initiated breakout session. In another alternative embodiment, the host must approve any invitation which a participant extends to another participant to join a participant-initiated breakout session.

As known by those skilled in the art, more than one of those meeting participants who are permitted to invite others to join participant-initiated breakout sessions, may do so at the same time, in which case a number of separate and distinct participant-initiated breakout sessions run simultaneously. In another embodiment, an individual participant may be invited to—and join—more than one participant-initiated breakout session.

In an alternative embodiment, a participant may invite all other meeting participants to join in a new separate breakout session. In another embodiment, any meeting participant (say Participant 2) who accepts an invitation from a participant (say Participant 1) to join a participant-initiated breakout session, may invite other meeting participants (for example Participant 3) to join.

The disclosure above has focused on embodiments in which the host must make a choice to let participants initiate private breakout rooms, after the videoconference session has started, at approximately the time the host creates (or starts) breakout rooms. In an alternative embodiment, the host makes this choice before the session starts, or even when the session is first scheduled.

Then, when a participant joins the session, that participant will be informed of the ability to initiate breakout rooms and other features of them (in a similar manner as participants may be informed that a session will be recorded).

This disclosure has focused on embodiments of the present invention within the context of an integrated videoconferencing system. In an alternative embodiment, the present invention is a separate, stand-alone application with videoconferencing capabilities on its own platform. This alternative embodiment is constructed so that a participant in a videoconferencing session on any videoconferencing system or platform can invite another participant in that session to a private session or room—though the private session manifests on a second platform. Before discussing implementation, consider the issues of constructing such an application today using prior art.

First, this is difficult because actual webcams only send a video stream to one application. Trying to connect to a second application while still connected to the first will bring an error message. Second, although stand-alone applications called "virtual cameras" overcome this limitation (for explanation of virtual cameras see discussion below and at http://videoblogtech.com/2019/09/19/using-a-virtual-camera-in-other-programs-web sites/, nonetheless the current use of virtual cameras teaches away from use in parallel, private, and small interactive videoconference sessions. Third, ongoing adoption of a number of virtual camera features (such as virtual backgrounds and filters) within videoconference systems (such as Zoom), discourages widespread use of independent virtual cameras. Fourth, a virtual camera application alone is not sufficient for this embodiment, nor is a videoconferencing platform, but the two must be linked with or integrated into the embodiment so that participants who do not have (or have not engaged) a virtual camera can be accommodated in the participant-initiated private session.

Some virtual cameras (e.g., SplitCam and ManyCam) provide the capabilities of, and are primarily marketed as, one-person video production studios. They can, for example, send video feeds over both Facebook Live and YouTube simultaneously. These virtual cameras provide the following kinds of tools usually seen in broadcast television engineering: virtual backgrounds (via replacement or chroma key, often called green screen technology), overlaid lower third banners (as used in news casts), text overlays, picture in picture overlays from several video feeds, drawn overlays (as in arrows on weather maps), clock and count-down timer overlays, overlaid two-dimensional images (sometimes called stickers), color filters (such as converting a color video image to black and white or sepia tones), static frames to be placed around the video feed, camera effects (e.g. distortions and color changes), image transformation (e.g., mirroring and inversion), image opacity and transparency, rapid switching between cameras and camera angles, rapid switching between pre-set amalgams of layered video feeds, and other image transformation.

Some of the overlays, such as hearts and emojis (often referred to as stickers), seem of more entertainment value than for commercial production. Because of face-tracking technology, these include silly virtual hats, animal ears, sunglasses, facial hair (e.g., mustaches and beards), face paint, tattoos, etc. Nonetheless, Zoom has added a number of these filters.

Snap Camera is another virtual camera (made by Snap, the makers of SnapChat messaging software), but rather than providing a full featured video production studio, the technology is used primarily for individuals to jazz up their own SnapChat short lived video messages.

The other component needed to effectuate participant-initiated private sidebar videoconference sessions is the ability to invite others to a videoconferencing session by sending them a clickable link within the session. Many videoconferencing systems allow text messages within the application, including Zoom, Microsoft Teams, and the open source Jitsi Meet (https://meet.jit.si/).

The prior art method by which a participant can initiate a private session from within an existing video conference meeting involves manually cobbling together these technologies. Participant 1 and Participant 2 both need to be using a virtual camera while participating in the videoconferencing session on Platform 1 (though not necessarily the same virtual camera). Then Participant 1 sends a text chat message to Participant 2, within the private text chat of Platform 1, suggesting a private meeting on a browser-based videoconferencing platform (or a videoconferencing platform which includes browser-based options for joining meetings)—and includes a clickable link to a videoconferencing session in Platform 2. When Participant 2 accepts the invitation by clicking on the link, both participants will be in a new private videoconferencing session on Platform 2—as well as the original session in Platform 1—each Platform instantiating in a separate window, with video feeds provided by the virtual cameras. These separate windows can be separately maximized, minimized, resized, and repositioned, using drag and drop technology. They can be placed one on top of the other as well. But it may be essential for both Participant 1 and Participant 2 to manually mute their mics in the Platform 1 application, in order to suppress background noise and audio feedback, and they may need to lower or mute the audio output of the Platform 2 application for the same reason. However, no private session can be initiated if Participant 2 does not have a second webcam or a virtual camera installed.

An alternative embodiment of the present invention automates this process, and provides for participants who are not already employing a virtual camera. The embodiment includes both (a) a virtual camera that can provide multiple video feeds and (b) basic elements of a videoconferencing system.

Figure 7:
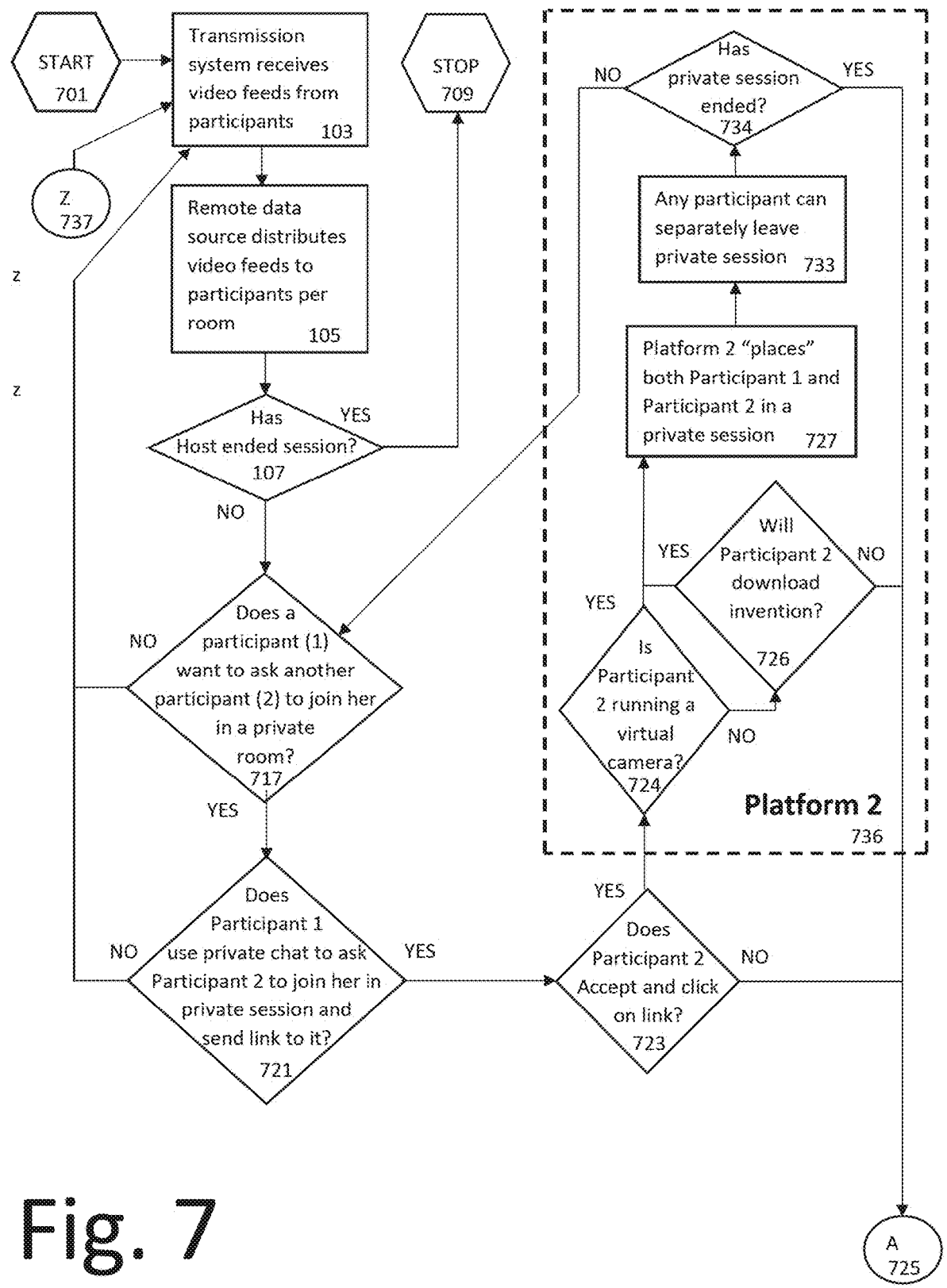
FIG. 7 is a flow chart of a participant initiating a private breakout session using an alternative embodiment of the present invention.

Consider FIG. 7, a flow chart of this alternative embodiment. The process assumes that as illustrated in FIG. 4 and FIG. 5 (described above), the host has started the videoconferencing session, that participants (419, 421, 423, 427, and 429 in FIG. 4) have logged in, and that video feeds from these participants are being sent from each participant to the system (433), and hence forwarded to all participants with video capabilities—at least until the host ends the session or a particular participant leaves it. It also assumes that Participant 1 has installed an application embodying this present alternative embodiment, which includes a virtual camera, and which Participant 1 has specified as the webcam for the videoconference session.

Referring again to the flow chart in FIG. 7, at the start (701) of the process, the transmission system received video feeds from the participants (103) noted above. Then per step 105, the remote data source (501 in FIG. 5) transmits and distributes video feeds (through the videoconferencing transmission system, 511 in FIGS. 5 and 401 in FIG. 4) to each participant per the room (or breakout room) which each has joined.

For example, FIG. 3A shows the gallery view of a videoconferencing session (distributed to all participants in step 105) with at least nine participants (their video feeds being 305, 307, 309, 311, 313, 315, 317, 319, and 321). These feeds are displayed within window, 303, on a computing device screen, 301. If the host has ended the videoconferencing session (107) the process stops (709).

Otherwise, the issue is whether any participant (without loss of generality, say Participant 1) wants to ask another participant (without loss of generality, say Participant 2) to join him or her in a breakout room (717). If no participant wants that, the process continues back to step 103 and the process starts over.

Otherwise, at decision point 721, does Participant 1 use the videoconferencing chat function to ask Participant 2 to join her in a private session, while providing a clickable link to the session? If Participant 1 does not ask Participant 2, the process continues back to step 103 and the process starts over. If Participant 1 does make the request (721) and Participant 2 replies "No" (723), the process flows through node A (725) and Z (737), back to step 103 and the process starts over.

On the other hand, if Participant 2 accepts the invitation (723), then Platform 2 (736) checks if Participant 2 is running a virtual camera, 724. If so, Platform 2 places both Participant 1 and Participant 2 in a private session on Platform 2 (727). This will appear in a new independent window, appearing as in FIG. 3B. As known to those skilled in the art, this window can be independently maximized to fill the computer screen (101), or can be displayed within a smaller window. This does not change the original video conferencing session or the participants shown in its window (as per FIG. 3A but with gestures changing over time). As known to those skilled in the art, these two windows can be independently resized and repositioned. The focus can be placed on either window, and either can be moved in front of the other.

At this point in the process, the private session with Participants 1 and 2, has been established. Either or both may leave the session (733). They may be able to rejoin as well, depending upon Platform 2 enabled features. If the private session has not yet ended (734), Participant 1 may wish to ask another participant in the original videoconference to join the private session (717) and the process continues. However, when the private session ends, 734, the process flows through node A (725) and Z (737), back to step 103. At that point, the process starts over and continues until the original videoconference session ends (709). Note, if the original videoconference ends before the private session, that private session will continue until it ends.

Consider again step 724. If Participant 2 is not running a virtual camera, a pop-up window requests him to download the invention as embodied in an application with a virtual camera. If Participant 2 does not do so, the process flows through node A (725) and Z (737), back to step 103. Otherwise, the application loads onto Participant 2's computing device, engages the virtual camera, and places Participant 1 and Participant 2 in a private session on Platform 2 (736).

In a preferred alternative embodiment, the virtual camera is a browser extension or plug-in. Engaging the virtual camera may require additional user prompts depending upon system specifics.

When initiating the private session, this embodiment will programmatically mute the microphones of Participant 1 and Participant 2 with respect to the videoconference session on its system and platform (so that the private conversation of Participant 1 and Participant 2 is not heard by the people in the underlying breakout room). The audio output may also have to be lowered or muted to suppress audio interference and echo, unless noise cancellation techniques such as Slotznick and/or Krisp are employed as discussed above. If that programmatic muting is thwarted by the code of the first platform, a pop-up window instantiated by Platform 2 will remind Participant 1 and Participant 2 to perform muting and audio adjustments themselves.

Platform 2 permits at least two instantiations of the application, so that this embodiment can be used for participant-initiated private session if the original videoconference is hosted on Platform 2.

Consider a watch-party website or online platform which provides a text chat function with clickable links, for groups of people to watch videos or live-streams together. Using the preferred embodiment of the present invention described immediately above, any participant of the watch-party is able to initiate videoconferencing video chat with the other members of the group. The preferred embodiment does this by providing a plurality of audio streams (including an audio from the event stream and at least one audio for the breakout session), with audio mixing features disclosed in Slotznick, as well as cross-stream noise cancellation features per Slotznick or Krisp. As known by those skilled in the art, today's computers recognize when computer audio output is directed to a set of headphones (or similar equipment such as earphones and earbuds) versus being directed to a loudspeaker. In the preferred embodiment, the cross-stream noise cancellation features are triggered when the system detects that audio output is sent to loudspeakers. Cross-stream noise cancellation is not implemented when headphones (or similar equipment) are detected as the output for system audio.

In an alternative embodiment, the present invention manifests as bridging software that allows individuals to experience both audio and video from at least two videoconferencing platforms at the same time (or at least two instantiations of the interface from one videoconferencing platform). In a preferred embodiment, the bridging software is integrated into videoconferencing software for a particular videoconferencing platform. However, as will be obvious to those knowledgeable in the art, the bridging software may also operate as a standalone application for linking independent third-party videoconferencing platforms.

A key component of the bridging software is a virtual camera. Basic features of a virtual camera are described above. The most essential feature for the bridging software with respect to the present invention is that the video feed from a webcam can be sent through the virtual camera to more than one other application as if from a webcam. There are many other features in different virtual cameras, known to those knowledgeable in the art, which particular embodiments of the present invention may incorporate.

A second key component of the bridging software is a virtual audio device. Similar to a virtual camera, a virtual audio device takes digitized audio feeds from one or more sources, and mixes, modifies, and filters the feed(s) and outputs the resulting digitized audio feed to one or more other applications as input. These other applications recognize the input as if from an audio device. Depending upon the particular use, software exhibiting the features of a virtual audio device is sometimes referred to by other terms known to those skilled in the art, including, but not limited to, a virtual microphone, a virtual mixer, a virtual cable (alternately, virtual audio cable), and a virtual speaker. There are overlapping terms, and a virtual audio device may include or be comprised of more than one such component.

As will be disclosed below, a preferred embodiment of the present invention requires at least two virtual audio devices (or two instantiations of the same virtual device). These two virtual audio devices may have the same features, or different features. Essential features for each device will be discussed below. One of the virtual audio devices sends an audio feed from the videoconference session participant's system (including any microphone(s) or computer audio) to the two or more videoconferencing platforms that are being engaged (or the two or more instantiations of a single videoconferencing platform). The other virtual audio device receives audio streams from the videoconferencing platforms, mixes them, and then sends a mixed audio feed to the speakers (or earphones) that the participant is using to listen to the different simultaneous videoconference sessions. This second virtual audio device also sends that feed to the first virtual audio device for use in filtering operations, such as noise reduction, feedback control, and echo suppression.

Some virtual cameras, especially those serving to engineer electronic live stream productions, act as if they are television production studios. They incorporate elements of the first virtual audio device described above, but teach away from this embodiment of the present invention, because their efforts are focused on producing one audio-video stream to be recorded or streamed "out," and not simultaneously with another audio (and video) streamed "in" which a participant in the two or more videoconference sessions is experiencing. The "in" and "out" audio streams of the present invention are distinct and different.

Figure 8:
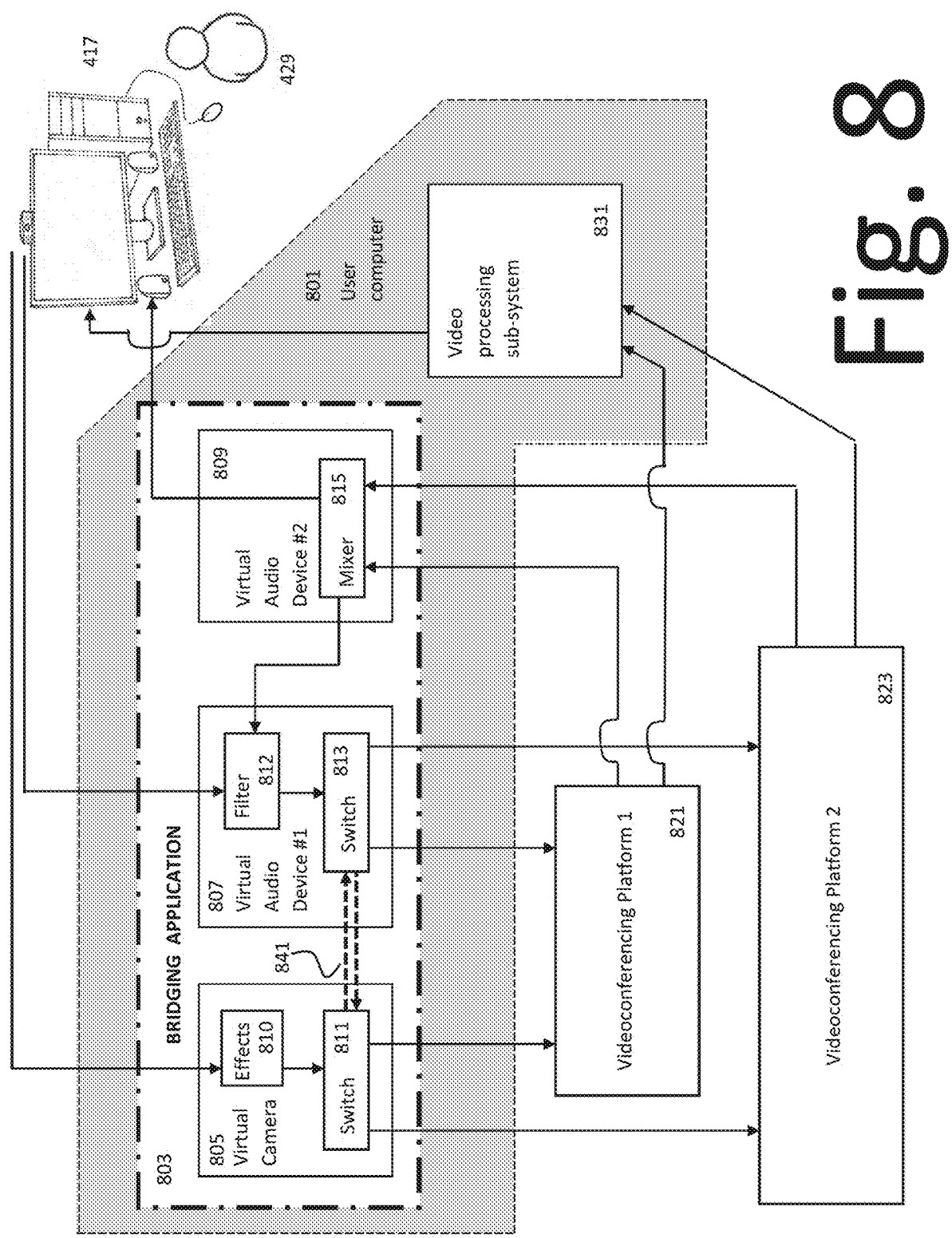
FIG. 8 is a schematic view, with information flows, of a preferred embodiment of the present invention as a bridging software application.

Consider now FIG. 8, which more fully illustrates the workings of this bridging software, 803. One of the users previously pictured in FIG. 4, is in front of a computing device, labeled 801 in FIG. 8. This computing device is one of the computing devices illustrated in FIG. 4, or shown diagrammatically in FIG. 5. Without loss of generality, let that be user 429 in front of computing device 417, (515 in FIG. 5), shown again in FIG. 8. The computing device includes a CPU, 523, a memory cache, 527, a screen or monitor, 529, speaker(s), 533, microphone, 537, keyboard, 539, webcam 541, and pointing device 542, as shown in FIG. 5, but which are not all shown in FIG. 8.

The bridging application, 803, includes a virtual camera, 805, a virtual audio device, 807, and a second virtual audio device, 809. The computing device also includes other video processing components, 831, used to process images, videos, livestreams, web pages, documents and other visual media (as known by those skilled in the art) so that they can be displayed on the screen (529 of FIG. 5) of the computing device, 801 (also shown as 417 in FIG. 8). In addition, the computing device includes ancillary audio and video processing components such as, but not limited to, short and long-term video and audio memory cache (527 of FIG. 5) and processing chips.

Consider the use of the bridging software application, 803, with two videoconferencing platforms (821, and 823), in a manner similar to that described in the flow chart of FIG.

7. First, decision point 724 in FIG. 7 is revised to read "Is Participant 2 running the bridging application?" and decision point 726 is revised to read "Will Participant 2 download the bridging application?". The remaining steps remain essentially the same.

Figure 10:
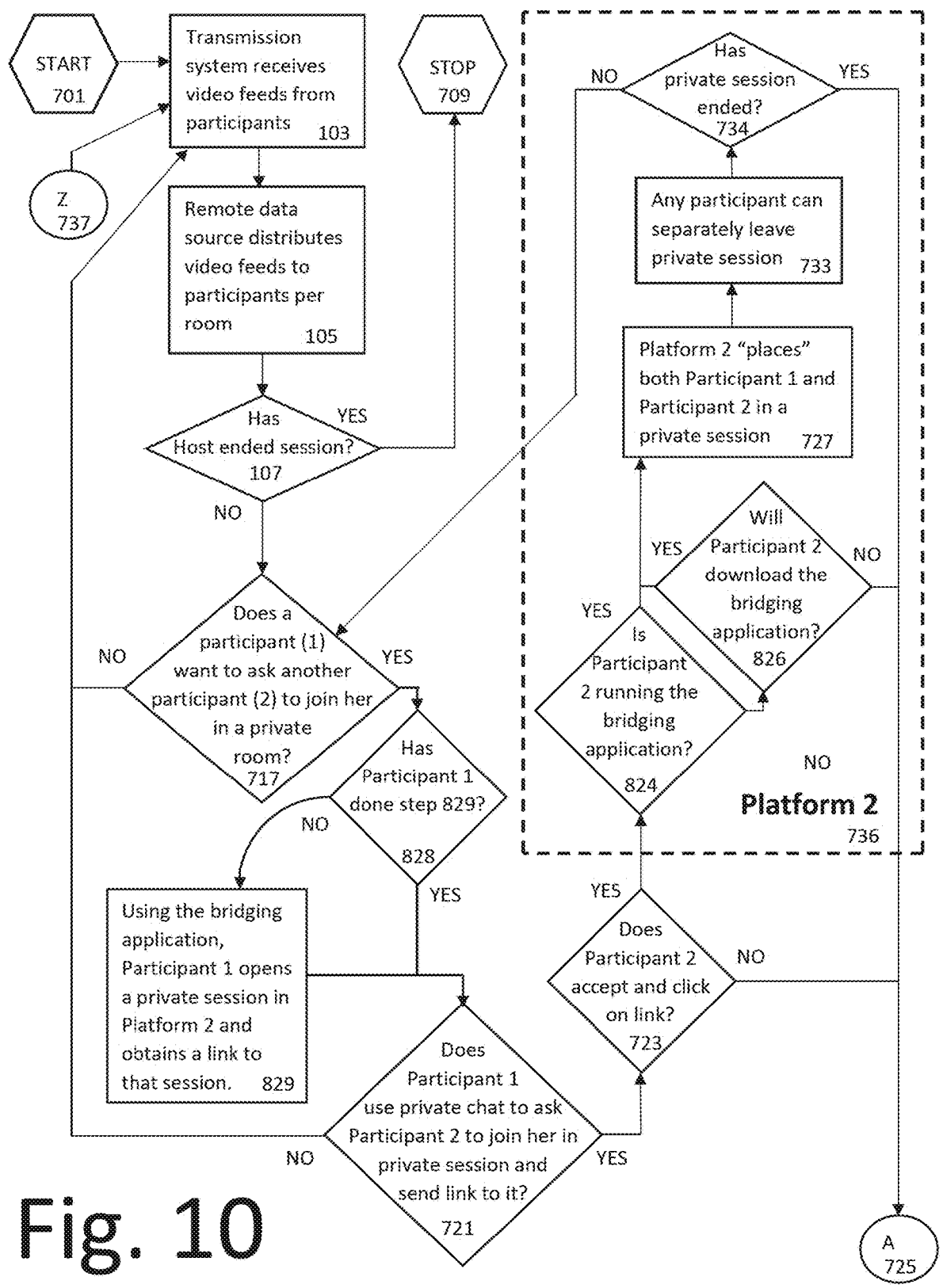
FIG. 10 is a revision of the flow chart in FIG. 7, to reflect use of the present invention in its embodiment as a bridging software application.

Consider FIG. 10, which incorporates these changes, as well as others. See decision points 824 and 826 in FIG. 10 which illustrates these changes to FIG. 7. Additional steps 828 and 829 are added to FIG. 10 to clarify that Participant 1 must use the bridging application to open a private session in platform 2 and obtain a link to that private session via the bridging application.

Figure 9:
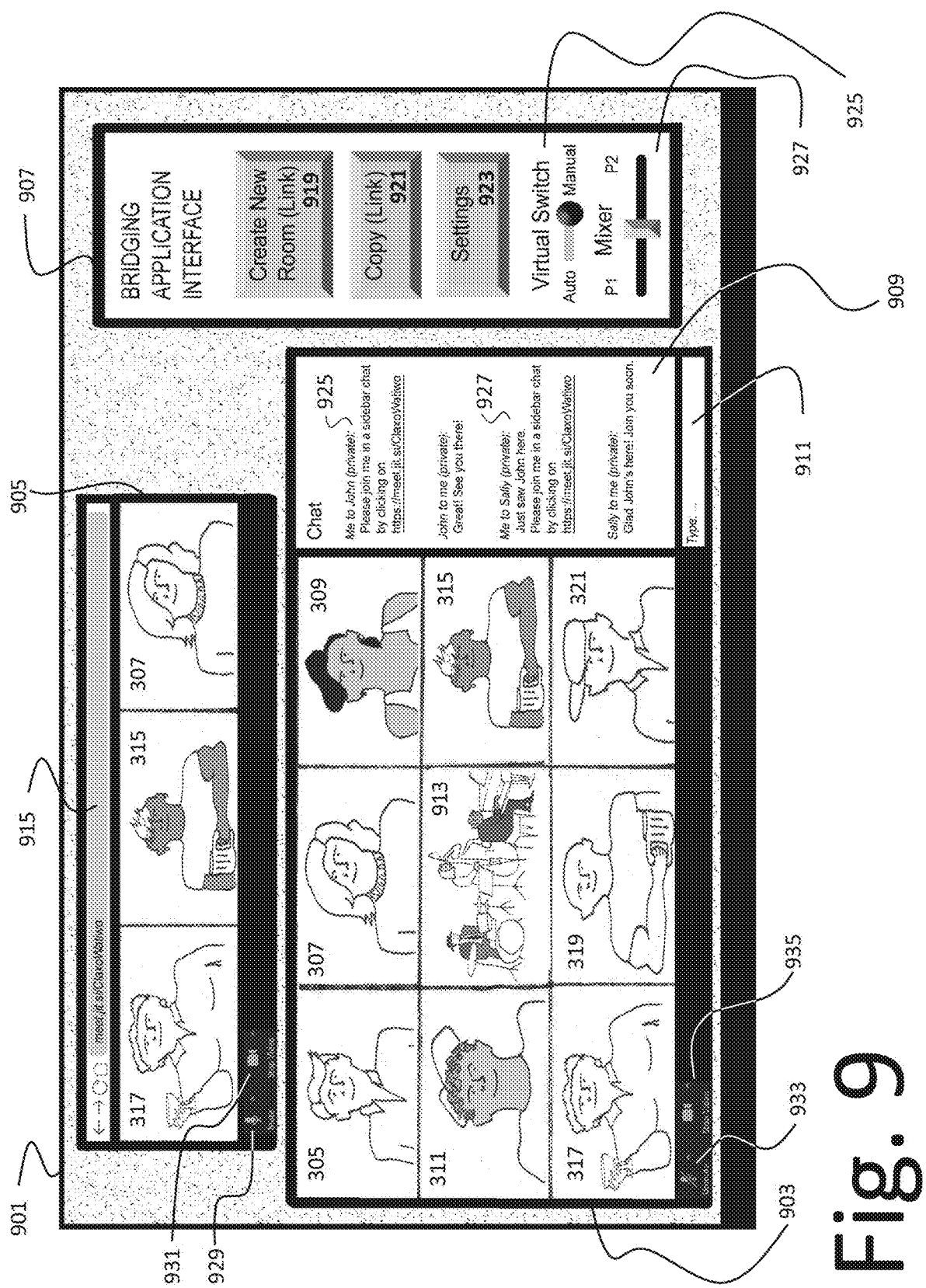
FIG. 9 is a generalized diagram of a computer screen, showing three active software applications, each in its own window, being (a) an instantiation of a videoconference on platform 1, (b) an instantiation of a videoconference on platform 2, and (c) a bridging application that provides connections between them.

Without loss of generality, let Participant 1 in FIG. 10 be the participant labeled as 429 in FIG. 8, as well as the participant whose video feed is labeled as 317 in FIG. 3A and FIG. 9.

Consider for a moment, FIG. 9, which shows a generalized diagram of Participant 1's computer screen (901). FIG. 9 shows three active software applications, each in its own window, being (a) an instantiation of a videoconference on platform 1 (903), (b) an instantiation of a videoconference on platform 2 (905), and (c) a bridging application that provides connections between them (907).

Without loss of generality, the participants in the videoconference on platform 1 (903) include those shown in FIG. 3A, with video feeds 305, 307, 309, 311, 315, 317, 319, and 321. Video feed 313 in FIG. 3A has been replaced by video feed 913, of a jazz trio, playing music. This might occur, for example when the individual whose video feed is 313 in FIG. 3A, has just introduced a jazz trio playing in the background behind 313 in the same physical room, and has stepped aside so that the webcam focuses on the trio. Alternatively, this could be an entirely new video feed.

Consider the state of FIG. 9 before the instantiation of a sidebar videoconference on platform 2 (905), and before the jazz trio began to play. Once the jazz trio started to play during the videoconference on platform 1 (903), the other participants (305, 307, 309, 311, 315, 317, 319, and 321) would need to be muted in order for them to hear the music uninterrupted. Participants could be self-muted, or muted by the host. See mute button 933 on the instantiation of platform 1 in window 903.

Consider now FIG. 9 in reference to decision point 717 of FIG. 10, when Participant 1 wishes to both hear the jazz trio in the background and converse with Participant 2 (labeled "John" with video feed 315) without disturbing other participants in the platform 1 session (903). With respect to FIG. 10, Participant 1 creates a private session in platform 2 (828 and 829 in FIG. 10), by clicking on button 919 in FIG. 9 in the bridging application 907. (Of course if Participant 1 previously created the private session, 828 in FIG. 10, Participant 1 can bypass 829.) This action launches an instantiation of platform 2, such as window 905 in FIG. 9 and creates a "launching" link to it that may be shared with others.

Depending upon the technology of platform 2, the link may have been created first, and activating the link launches a browser-based instantiation of platform 2. For example, some videoconferencing platforms, such as Jitsi or Wonder, are browser-based. For such platforms, 905 may be a browser window. The link will appear in the browser window's address box, 915. In the case of other platforms such as Zoom, 905 is a native Zoom application window, but is triggered when a person clicks on a link created by Zoom for that session. Clicking on a link opens the browser window, which triggers the native Zoom application.

At this point, before Participant 1 has invited anyone to a sidebar conversation, only Participant 1's video feed (317) would show in window 905. When creating the room and its link, the bridging application appends its link to the stored text invitation in memory cache.

There is a default invitation. In the example in FIG. 9 it is, "Please join me in a sidebar chat by clicking on". In this example the room link is https://meet.jitsi/ClaxoWatiwo. The wording of the invitation can be changed by the user in the settings function, accessed via button 923 on the bridging application interface 907.

Participant 1 then places the computer cursor in the message entry box (911) to the chat function (909) of platform 1 window (903) and chooses a recipient, Participant 2 ("John" in this example) for the private invitation message. (The choice interface for recipient of a private message is not shown, being different in every videoconference platform, but all using similar private messaging techniques known to those skilled in the art.) Participant 1 then pastes the invitation with link (which is in Participant 1's computer cache) into box 911 using methods well known to those skilled in the art.

Participant 1 then activates the computer's "Enter" key. The message is sent to Participant 2 (John, 315) and appears as private in the chat message windows of both Participant 2 (John) and Participant 1. This is shown in FIG. 10 as decision point 721.

On Participant 1's chat window the message reads "Me to John (private): Please join me in a sidebar chat by clicking on https://mee4t.jit.si/ClaxoWatiwo" (925). For Participant 2 the wording will be slightly different, such as "Participant 1 to Me (private): Please join me in a sidebar chat by clicking on https://mee4t.jit.si/ClaxoWatiwo".

If Participant 2 (John) wishes to join the sidebar conversation, Participant 2 (John) clicks on the link (decision point 723 of FIG. 10). Then if Participant 2 is either running the bridging application (824) or downloads the bridging application (826), Participant 2 will be admitted by platform 2 to the private session "room" (727 of FIG. 10). When being admitted by platform 2 to the private session "room", Participant 2's video feed (313) is also displayed in the platform 2 application window 905 in FIG. 9.

If Participant 1 wishes to ask another participant to also join the sidebar discussion (say "Sally" whose video feed is 307 in window 903 of FIG. 9), Participant 1 issues an invitation in platform 1 via private message (927). Note that this example of a private message also shows how Participant 1 can begin the message by typing additional text (i.e., "Just saw John here") before pasting the rest of the invitation with the link into the message entry box 911. When Sally clicks on the link in the message, Sally joins the sidebar meeting in similar manner as John (see Sally's video feed 307 in platform 2 window 905).

Stepping back to when only two participants are in the sidebar session, after the Participants 1 and 2 are connected per FIG. 10, consider again FIG. 8. The video feed from the webcam, 541, of Participant 1 (429 in FIG. 8) is sent to the virtual camera, 805, in Participant 1's computer, 801. The virtual camera, 805, adds video effects chosen by Participant 1, 810. (Note, as known to those skilled in the art, there are numerous video effects not enumerated here, and Participant 1 may choose to add or not add any such effects.) The resultant video feed (after passing through a switch, 811) is then output to the two videoconferencing platforms or systems (821 and 823). Each video conferencing system contains components shown in FIG. 4 and FIG. 5. (As noted above, 821 and 823 may be separate and distinct platforms, or instead two instantiations of the videoconferencing software of one videoconferencing platform with different, but overlapping, sets of participants.)

This use of a virtual camera is described above in the initial discussion of FIG. 7. However, in addition, the bridging application also processes the audio from Participant 1 (429) through a virtual audio device, 807, and that processed digital audio feed, after passing through switch 813 described in more detail below, is also output to the two videoconferencing platforms (821 and 823). The virtual audio device 807 includes a filter 812 (described in more detail below), to suppress additional noise or sound artifacts introduced into the system by the bridging application, for reasons more apparent below.

In this regard, current videoconferencing applications, such as Zoom, allow the user to choose (a) which camera or virtual camera will be used for video input, (b) which microphone or virtual audio device will be used for audio input, and (c) which audio output device (e.g., speaker, headphones, etc.) will be used for audio output.

Importantly, the software for each video conferencing platform may also add video effects (such as virtual backgrounds, mirroring, common backgrounds, or a shared screen) or adjust the audio (such as a filter for echo or noise suppression or the addition of shared computer sound) based upon the context and features of each particular videoconferencing session (as being hosted by the two platforms) in which Participant 1 is participating. For example, Zoom has designed its platform to permit sessions with many participants, so it is designed to allow only one speaker at a time, in order to prevent cacophony of dozens or hundreds trying to speak at once. On the other hand, Wonder (see https://www.wonder.me/) does not permit groups (called "circles" and similar to breakout groups) to be larger than 15 people. Because only 15 people can be in a group, and these people can generally see each other on the screen, it is easier for them to self-regulate their conversation through visual cues. Consequently, as of January 2021, Wonder did not single out a primary speaker to be heard while suppressing the rest.

Each video conferencing system (821 and 823) sends the audio and video input from the bridging application (803) of Participant 1 (429) to the other participants in their respective videoconferencing sessions, per FIG. 4 and FIG. 5. Within each platform, session participants send audio and video back to the respective platform which sends the audio and video back to Participant 1.

The video feeds received by the computer 801 of Participant 1 (429) are processed as in 105 of FIG. 10, via the computer's video processing sub-system(s), 833, and displayed in the window of the respective videoconferencing application (for 821 or 823 in FIG. 8) on the computer screen (527 of FIG. 5) on the computing device (417 in FIG. 8).

However, the audio feeds received by the computer 801 from the two videoconferencing platforms (821 and 823) are processed through a mixer (815) in the second virtual audio device (809), and then played aloud through the audio output device (e.g., speaker or microphone, such as 513 in FIG. 5) of the computing device (417 in FIG. 8).

Importantly, the mixer, 815, allows Participant 1 to choose the relative volume of the audio from each of the two videoconferencing sessions in which she is participating (in FIG. 9, these two platforms are platform 1, 903, and platform 2, 905). FIG. 9 shows a mixer control for setting relative volume in the form of a slider (927), but as known to those skilled in the art, a mixer control can take other forms and visualizations. For example, instead of one slider controlling the relative volume of the two audio streams, each of the two audio streams is controlled by a virtual knob, dial or slider separately, each of which virtual controls gradually or incrementally increases—and decreases—the sound level, audio gain, or amplitude of decibel output of that audio stream—thereby adjusting how loud the audio stream sounds to the participant. Using slider 927, Participant 1 may listen to the audio from platform 1 at a lower volume, while having a relatively louder audio discussion with those in the private session platform 2, or vice-versa.

Just as importantly, the mixer, 815, also sends its digital audio output to the filter, 812, of virtual audio device 807. This allows the audio from both videoconferencing sessions from the two videoconferencing platforms to be subtracted from, or filtered out of, the digital audio feed input to virtual audio device 807, consistent with Slotznick and as is known by those skilled in the art of audio mixing and sound suppression. (As noted above, in the alternative, other methods of noise cancellation, such as Krisp's use of artificial intelligence, are used.) This will suppress the echo and feedback noise that would otherwise occur from having two audio streams and feeds going at the same time (when a participant is using loudspeakers rather than earphones). In other words, using the output from the mixer as a filter ensures that only Participant 1's voice will be input to the two systems, even though she is listening to output from two systems.

Note, as mentioned above, each videoconferencing system (821 and 823) may separately introduce additional audio elements or feeds (such as digital music on Participant 1's computer or streaming over the internet to it) that is be transmitted over its system, but will not be heard in the other system.

Consider now the switches 811 and 813. In a preferred embodiment the two switches are paired and work in tandem. That is, they communicate with each other, 841, and act in concert. In a default (or "manual") setting, the video feed from the virtual camera 805 and the audio feed from the virtual audio device 807 are both sent to both videoconferencing platforms (821 and 823). FIG. 9 shows these virtual switches set to manual using control 925.

As is well known to those skilled in the art, the user interface for a videoconferencing platform allows an individual user to mute himself or herself, as well as turn off (or stop) the video feed from his or her webcam to the system. As discussed above, Participant 1 may wish to manually stop her video feed, as well as her audio feed to the session on videoconferencing platform 1 (821), while she is in private conversation with Participant 2 on videoconferencing platform 2 (823). Participant 1 can do this in the default ("manual") setting for the bridging software 803.

Similarly, Participant 1 and Participant 2 may choose to turn off video feed for platform 2, so that they see each other on platform 1, but are muted on platform 1, while hearing each other (as well as the session on platform 1) on platform 2 through the virtual audio device in the bridging application. This is analogous to two people being in a videoconferencing session and muted, while engaging in a private phone conversation with each other over their cell phones. Often, people in a videoconferencing session will not know each other personally, and may not have each other's contact information, such as phone numbers or email. This bridging application embodiment of the present invention allows attendees at a videoconference session to engage in meaningful sidebar networking before they decide to exchange contact information such as phone numbers.

At the same time, Participant 1 may wish to ask a question, answer a question, or make a comment in the videoconferencing meeting on platform 1, without the other participants on platform 1 knowing that Participant 1 and Participant 2 are also engaged in a simultaneous private breakout session. As known to those skilled in the art, Participant 1 does this by unmuting platform 1 using a variety of controls in platform 1 or the bridging interface, some of which are discussed below.

In an alternative embodiment the bridging application omits a virtual camera, while including other components described above, so that the private auxiliary session is audio only.

In an alternate "automatic" setting, switches 811 and 813 work in tandem, sending both the audio and video feeds to either videoconferencing platform 1 (821) or videoconferencing platform 2 (823) but not both. The other platform receives an "empty" signal. The empty audio signal is silence. The empty video signal may be no signal, or a still image profile of Participant 1. The user interface for the bridging software 803 (see control 925 in FIG. 9) provides a control by which the user (here Participant 1) designates whether the switches are set to manual or automatic. Whether the automatic setting makes both audio and video automatic, or just one of them (and which one) is adjustable in the settings, 923.

When the virtual switches are set to manual via 923, the mute buttons (929 and 933) work independently. The user may set either or both to either open or mute. The user must be careful to watch for and avoid echo and feedback. Also, when the virtual switches are set to manual, the stop video buttons (931 and 935) work independently.

In contrast, when the virtual switches are set to automatic, the bridging application monitors the state of the mute and stop video buttons, so that only one audio stream and one video stream is sent to a platform. That is, if Participant 1 sets 929 to mute, then the bridging application turns 933 to unmute (and vice-versa). Likewise, if Participant 1 sets 931 to stop video, then the bridging application makes sure that video 933 is turned on (and vice-versa).

To accomplish this, the bridging application listens for events relevant to the two platforms, and then uses platform commands (such as hot keys published in user guides, or function calls published in Software Development Kits or SDKs).

In an alternative embodiment, the switch coordination works differently, based upon system constraints, user preferences, and videoconferencing platform architecture.

In the case where the bridging application launches only one specific platform 2, the user interface can be simplified. The invitation from Participant 1 to Participant 2, with the link to platform 2, can be built into the application, ready for pasting, via a hotkey or copy and paste. As known to those skilled in the art, The bridging application interface includes a "copy" button (923 of FIG. 9) to copy the invitation and link to the user's pasting memory cache—just in case the user has otherwise used the computers more general copy and paste functions for other purposes during the course of the videoconferencing session.

As mentioned above, and in ways well known to those skilled in the art, the "settings" component of the bridging application allows the user to customize the wording of the invitation, and where to obtain the link to launch the session in platform 2. In the case where the bridging application is created as a stand-alone product, the user can choose among platforms and applications to launch as platform 2. As mentioned before, different videoconferencing platforms have different features and facilitate different kinds of personal interactions. Consequently, a user may have accounts with several of them, and choose to invite someone he or she meets online at a video conference session to a particular specific platform for sidebar discussion depending upon both the platform of the main videoconference session and the kind of personal, business, social, or networking interaction the user wishes to initiate. For example, the user may prefer to use one platform for an invitation to a short formal sidebar discussion and another platform for an after-conference "afterparty" get-together. When multiple platforms are user-choose-able, the bridging application interface makes selection among them part of a drop-down menu activated by hovering over or activating the copy button, 921. Those skilled in the art know of and may substitute other common methods of choice in the interface.

In this way the embodiment of the present invention by way of a bridging application allows self-selected participants in an online videoconferencing session to have a side audio-video conversation amongst themselves while still seeing and hearing ongoing discussion in the original session.

Consider again a watch-party website or online platform which provides a text chat function with clickable links, for groups of people to watch videos or live-streams together. Using the preferred embodiment of the present invention as a bridging application, any participant of the watch-party is able to initiate videoconferencing video chat with the other members of the group, while still listening to the video or live-stream without creating feedback or background noise. The preferred embodiment of the present invention as a bridging application does this by providing a plurality of audio streams (including an audio from the event stream and at least one audio for the breakout session), with audio mixing features shown in FIG. 8 and FIG. 9 (and also disclosed in Slotznick) and noise cancellation features shown in FIG. 8 (and also taught in Slotznick and Krisp). As known by those skilled in the art, today's computers recognize when computer audio output is directed to a set of headphones (or similar equipment such as earphones and earbuds) versus being directed to a loudspeaker. In the preferred embodiment, the cross-stream noise cancellation features are triggered when the system detects that audio output is sent to loudspeakers. Cross-stream noise cancellation is not implemented when headphones (or similar equipment) are detected as the output for system audio.

This embodiment allows the creation of richer videoconferencing environments, by permitting (indeed, facilitating) the amalgamation of disparate videoconferencing platforms and architectures. Consider, for example, that webinar style applications seek to replicate a lecture style environment with limited interaction between audience members and the lecturer/presenters. In contrast, meeting style applications seek more interaction among audience members, seeking to replicate the interactions of small seminar-style meetings and medium sized classrooms. Zoom for example, supports both kinds of applications, but the design choices allocate internet bandwidth differently. In a webinar style event, bandwidth is allocated to maximizing the viewing audience, which can reach tens of thousands, whereas in meeting style events, bandwidth is allocated to maximizing possible interactions among the audience, and is usually limited to 1000. Other videoconferencing systems, such as Gather and Wonder are designed to encourage more fluid social interactions among smaller groupings of people, more like the flow of conversation among attendees at a cocktail party or social networking event, with ever-changing small groupings within a virtual meeting space with interaction-ability governed by modeling the proximity of participant avatars.

A real in-person conference (trade-show, academic, or organizational) has many different kinds of in-person sessions, often at the same time: lectures, seminars, breakout sessions, sales booths, poster sessions, social gatherings at coffee shops, bars, and dance parties, as well as team building exercises and excursions. Each type of in-person session facilitates different kinds of personal interactions. A real in-person conference uses different kinds of physical space and physical architecture to help organize these different sessions. Likewise, the best ways to simulate these different kinds of interactions online are by creating different online experiences using different platform architectures. The embodiment of the present invention in the form of bridging software allows different online experiences hosted on different platforms to be accessed simultaneously through a single online portal, and just as importantly, allows a user to seamlessly transition from one online environment to another.

In an alternate embodiment, only one platform or session is displayed at a time, and hotkeys (such as ALT TAB, in Windows) are used to switch which sessions are in focus. Alternately the user clicks on a different icon in a tray of icons at the bottom of the screen, to bring one session/platform into focus.

The present invention and its alternative embodiments allow participants in a videoconferencing session to have more effective and personal conversations and interactions.

It should be appreciated by those skilled in the art that various modifications and variations may be made to the present invention without departing from the scope and spirit of the invention. It is intended that the present invention include such modifications and variations as come within the scope of the present invention.

What is claimed is:

1. A method for simultaneously displaying a session view of a videoconferencing session and a non-host participant-initiated breakout session view in a single online meeting user interface, the session view displaying a video feed of the videoconferencing session to meeting participants of the videoconferencing session on their respective participant computers, wherein breakout session participants are a subset of the meeting participants, the method comprising:
   (a) receiving, by a videoconferencing system, video feeds of each of the meeting participants, the video feeds being camera-captured views of each of the meeting participants;
   (b) generating, by the videoconferencing system, instructions for a session view of the videoconferencing session in the online meeting user interface for viewing by the meeting participants;
   (c) creating, by the videoconferencing system, a non-host participant-initiated breakout session upon initiation by one of the meeting participants, the non-host participant-initiated breakout session including the meeting participant who initiated the non-host participant-initiated breakout session and any meeting participants who accepted an invitation to join the non-host participant-initiated breakout session,
     wherein the meeting participant who initiated the non-host participant-initiated breakout session and any meeting participants who accepted the invitation to join the non-host participant-initiated breakout session are the breakout session participants;
   (d) generating, by the videoconferencing system, instructions for a non-host participant-initiated breakout session view in the online meeting user interface for the breakout session participants using the video feeds of the respective breakout session participants; and
   (e) transmitting, by the videoconferencing system, via an electronic network in communication with the videoconferencing system, instructions to the respective meeting participant computers, the instructions being instructions to:
     (i) display only the session view of the session to each of the meeting participants who are not breakout session participants, and
     (ii) simultaneously display the non-host participant-initiated breakout session view and at least a portion of the session view of the videoconferencing session to each of the meeting participants who are breakout session participants,
   wherein the breakout session participants are allowed to interact with each other within the non-host participant-initiated breakout session while simultaneously viewing at least a portion of the session view of the videoconferencing session,
   wherein the session view of the videoconferencing session is a breakout session, the non-host participant-initiated breakout session thereby being of a further breakout session created from the videoconferencing session that is a breakout session, and
   wherein the videoconferencing session that is a breakout session is formed by meeting participants of the videoconferencing session who are in proximity to each other in virtual space within the videoconferencing system.

2. The method of claim 1 wherein the instructions generated by the videoconferencing system for the session view of the videoconferencing session in the online meeting user interface for the meeting participants uses the video feeds of each of the meeting participants.

3. The method of claim 1 wherein the non-host participant-initiated breakout session overlays at least a portion of the session view of the videoconferencing session, or the session view of the videoconferencing session overlays at least a portion of the non-host participant-initiated breakout session.

4. The method of claim 1 wherein the non-host participant-initiated breakout session is displayed in a non-overlapping manner with respect to the session view of the videoconferencing session, thereby allowing the breakout session participants to view the session view of the videoconferencing session in an unobstructed manner.

5. A method for enhancing a session view of a videoconferencing session of meeting participants in a first videoconferencing system with a simultaneously displayed participant-initiated breakout session view in a second videoconferencing system of a breakout session initiated from the first videoconferencing session, the session view and the participant-initiated breakout session view displaying video feeds of the meeting participants on their respective participant computers, the video feeds being camera-captured views of each of the meeting participants, wherein breakout session participants are a subset of the meeting participants, and wherein the first videoconferencing system displays the session view to each of the meeting participants, the method comprising:
   (a) creating, by the second videoconferencing system, the participant-initiated breakout session upon initiation by one of the meeting participants, the participant-initiated breakout session including the meeting participant who initiated the participant-initiated breakout session and any meeting participants who accepted an invitation to join the participant-initiated breakout session,
  wherein the meeting participant who initiated the participant-initiated breakout session and any meeting participants who accepted the invitation to join the participant-initiated breakout session are the breakout session participants;
(b) receiving, by the second videoconferencing system, the video feeds of each of the breakout session participants, the video feeds being camera-captured views of each of the breakout session participants;
(c) generating, by the second videoconferencing system, instructions for a participant-initiated breakout session view in the online meeting user interface of the second videoconferencing system for viewing by the breakout session participants using the video feeds of the respective breakout session participants; and
(d) transmitting, by the second videoconferencing system, via an electronic network in communication with the second videoconferencing system, instructions to the participant computers of the breakout session participants, the instructions being instructions to display the participant-initiated breakout session view to each of the breakout session participants,
  wherein the breakout session participants are allowed to interact with each other within the breakout session while simultaneously viewing at least a portion of the session view, and
  wherein the session view of the videoconferencing session is a breakout session, the participant-initiated breakout session thereby being of a further breakout session created from the videoconferencing session that is a breakout session, and
  wherein the videoconferencing session that is a breakout session is formed by meeting participants of the videoconferencing session who are in proximity to each other in virtual space within the videoconferencing system.

6. The method of claim 5 wherein the session view of a videoconferencing session in the first videoconferencing system is a watch party, the second videoconferencing system thereby enhancing the watch party with the participant-initiated breakout session view transmitted to each of the breakout session participants.

7. A method for simultaneously displaying a session view of a videoconferencing session and a participant-initiated breakout session view in a single online meeting user interface, the session view displaying a video feed of the videoconferencing session to meeting participants of the videoconferencing session on their respective participant computers, wherein breakout session participants are a subset of the meeting participants, and wherein the videoconferencing system allows the breakout session participants to simultaneously hear audio of the session view and audio of the breakout session participants, the method comprising:
  (a) receiving, by a videoconferencing system, video feeds of each of the meeting participants, the video feeds being camera-captured views of each of the meeting participants;
  (b) generating, by the videoconferencing system, instructions for a session view of the videoconferencing session in the online meeting user interface for viewing by the meeting participants;
  (c) creating, by the videoconferencing system, a participant-initiated breakout session upon initiation by one of the meeting participants, the participant-initiated breakout session including the meeting participant who initiated the participant-initiated breakout session and any meeting participants who accepted an invitation to join the participant-initiated breakout session,
    wherein the meeting participant who initiated the participant-initiated breakout session and any meeting participants who accepted the invitation to join the participant-initiated breakout session are the breakout session participants;
  (d) generating, by the videoconferencing system, instructions for a participant-initiated breakout session view in the online meeting user interface for the breakout session participants using the video feeds of the respective breakout session participants;
  (e) transmitting, by the videoconferencing system, via an electronic network in communication with the videoconferencing system, instructions to the respective meeting participant computers, the instructions being instructions to:
    (i) display only the session view to each of the meeting participants who are not breakout session participants, and
    (ii) simultaneously display the participant-initiated breakout session view and at least a portion of the session view to each of the meeting participants who are breakout session participants,
    wherein the breakout session participants are allowed to interact with each other within the breakout session while simultaneously viewing at least a portion of the session view; and
  (f) receiving, by the videoconferencing system, from the breakout session participants, audio level control signals to independently control the audio of the session view and the audio of the breakout session participants,
    wherein the session view of the videoconferencing session is a breakout session, the participant-initiated breakout session thereby being of a further breakout session created from the videoconferencing session that is a breakout session, and
    wherein the videoconferencing session that is a breakout session is formed by meeting participants of the videoconferencing session who are in proximity to each other in virtual space within the videoconferencing system.

8. A computer-implemented apparatus for simultaneously displaying a session view of a videoconferencing session and a non-host participant-initiated breakout session view in a single online meeting user interface, the session view displaying a video feed of the videoconferencing session to meeting participants of the videoconferencing session on their respective participant computers, wherein breakout session participants are a subset of the meeting participants, the apparatus comprising a videoconferencing system configured to:
  (a) receive video feeds of each of the meeting participants, the video feeds being camera-captured views of each of the meeting participants;
  (b) generate instructions for a session view of the videoconferencing session in the online meeting user interface for viewing by the meeting participants;
  (c) create a non-host participant-initiated breakout session upon initiation by one of the meeting participants, the non-host participant-initiated breakout session including the meeting participant who initiated the non-host participant-initiated breakout session and any meeting participants who accepted an invitation to join the non-host participant-initiated breakout session, wherein the meeting participant who initiated the non-host participant-initiated breakout session and any meeting participants who accepted the invitation to join the non-host participant-initiated breakout session are the breakout session participants;
(d) generate instructions for a non-host participant-initiated breakout session view in the online meeting user interface for the breakout session participants using the video feeds of the respective breakout session participants; and
(e) transmit, via an electronic network in communication with the videoconferencing system, instructions to the respective meeting participant computers, the instructions being instructions to:
  (i) display only the session view of the videoconferencing session to each of the meeting participants who are not breakout session participants, and
  (ii) simultaneously display the non-host participant-initiated breakout session view and at least a portion of the session view of the videoconferencing session to each of the meeting participants who are breakout session participants,
  wherein the breakout session participants are allowed to interact with each other within the non-host participant-initiated breakout session while simultaneously viewing at least a portion of the session view of the videoconferencing session,
  wherein the session view of the videoconferencing session is a breakout session, the non-host participant-initiated breakout session thereby being of a further breakout session created from the videoconferencing session that is a breakout session, and
  wherein the videoconferencing session that is a breakout session is formed by meeting participants of the videoconferencing session who are in proximity to each other in virtual space within the videoconferencing system.

9. The apparatus of claim 8 wherein the instructions generated by the videoconferencing system for the session view of the videoconferencing session in the online meeting user interface for the meeting participants uses the video feeds of each of the meeting participants.

10. The apparatus of claim 8 wherein the non-host participant-initiated breakout session overlays at least a portion of the session view of the videoconferencing session, or the session view of the videoconferencing session overlays at least a portion of the non-host participant-initiated breakout session.

11. The apparatus of claim 8 wherein the non-host participant-initiated breakout session is displayed in a non-overlapping manner with respect to the session view of the videoconferencing session, thereby allowing the breakout session participants to view the session view of the videoconferencing session in an unobstructed manner.

12. A computer-implemented apparatus for enhancing a session view of a videoconferencing session of meeting participants in a first videoconferencing system with a simultaneously displayed participant-initiated breakout session view of a breakout session initiated from the first videoconferencing session, the session view and the participant-initiated breakout session view displaying video feeds of the meeting participants on their respective participant computers, the video feeds being camera-captured views of each of the meeting participants, wherein breakout session participants are a subset of the meeting participants, and wherein the first videoconferencing system displays the session view to each of the meeting participants, the apparatus comprising a second videoconferencing system configured to:
(a) create the participant-initiated breakout session upon initiation by one of the meeting participants, the participant-initiated breakout session including the meeting participant who initiated the participant-initiated breakout session and any meeting participants who accepted an invitation to join the participant-initiated breakout session,
  wherein the meeting participant who initiated the participant-initiated breakout session and any meeting participants who accepted the invitation to join the participant-initiated breakout session are the breakout session participants;
(b) receive the video feeds of each of the breakout session participants, the video feeds being camera-captured views of each of the breakout session participants;
(c) generate instructions for a participant-initiated breakout session view in the online meeting user interface of the second videoconferencing system for viewing by the breakout session participants using the video feeds of the respective breakout session participants; and
(d) transmit, via an electronic network in communication with the second videoconferencing system, instructions to the participant computers of the breakout session participants, the instructions being instructions to display the participant-initiated breakout session view to each of the breakout session participants,
  wherein the breakout session participants are allowed to interact with each other within the breakout session while simultaneously viewing at least a portion of the session view,
  wherein the session view of the videoconferencing session is a breakout session, the participant-initiated breakout session thereby being of a further breakout session created from the videoconferencing session that is a breakout session, and
  wherein the videoconferencing session that is a breakout session is formed by meeting participants of the videoconferencing session who are in proximity to each other in virtual space within the videoconferencing system.

13. The apparatus of claim 12 wherein the session view of a videoconferencing session in the first videoconferencing system is a watch party, the second videoconferencing system thereby enhancing the watch party with the participant-initiated breakout session view transmitted to each of the breakout session participants.

14. A computer-implemented apparatus for simultaneously displaying a session view of a videoconferencing session and a participant-initiated breakout session view in a single online meeting user interface, the session view displaying a video feed of the videoconferencing session to meeting participants of the videoconferencing session on their respective participant computers, wherein breakout session participants are a subset of the meeting participants, wherein the videoconferencing system allows the breakout session participants to simultaneously hear audio of the session view and audio of the breakout session participants, the apparatus comprising a videoconferencing system configured to:
(a) receive video feeds of each of the meeting participants, the video feeds being camera-captured views of each of the meeting participants;

(b) generate instructions for a session view of the videoconferencing session in the online meeting user interface for viewing by the meeting participants;
(c) create a participant-initiated breakout session upon initiation by one of the meeting participants, the participant-initiated breakout session including the meeting participant who initiated the participant-initiated breakout session and any meeting participants who accepted an invitation to join the participant-initiated breakout session,
   wherein the meeting participant who initiated the participant-initiated breakout session and any meeting participants who accepted the invitation to join the participant-initiated breakout session are the breakout session participants;
(d) generate instructions for a participant-initiated breakout session view in the online meeting user interface for the breakout session participants using the video feeds of the respective breakout session participants;
(e) transmit, via an electronic network in communication with the videoconferencing system, instructions to the respective meeting participant computers, the instructions being instructions to:
   (i) display only the session view to each of the meeting participants who are not breakout session participants, and
   (ii) simultaneously display the participant-initiated breakout session view and at least a portion of the session view to each of the meeting participants who are breakout session participants,
   wherein the breakout session participants are allowed to interact with each other within the breakout session while simultaneously viewing at least a portion of the session view; and
(f) receive, from the breakout session participants, audio level control signals to independently control the audio of the session view and the audio of the breakout session participants,
   wherein the session view of the videoconferencing session is a breakout session, the participant-initiated breakout session thereby being of a further breakout session created from the videoconferencing session that is a breakout session, and
   wherein the videoconferencing session that is a breakout session is formed by meeting participants of the videoconferencing session who are in proximity to each other in virtual space within the videoconferencing system.

* * * * *